(12) United States Patent
Kristiansson et al.

(10) Patent No.: US 12,052,950 B2
(45) Date of Patent: Aug. 6, 2024

(54) LAWN MAINTENANCE MACHINE

(71) Applicant: Turf Gamechanger Oy, Pirkkala (FI)

(72) Inventors: Pasi Kristiansson, Ylivieska (FI); Ilkka Kaivosoja, Porvoo (FI)

(73) Assignee: Turf Gamechanger Oy, Pirkkala (FI)

( * ) Notice: Subject to any disclaimer, the term of this patent is extended or adjusted under 35 U.S.C. 154(b) by 773 days.

(21) Appl. No.: 17/253,202

(22) PCT Filed: Jun. 25, 2019

(86) PCT No.: PCT/FI2019/050496
§ 371 (c)(1),
(2) Date: Dec. 17, 2020

(87) PCT Pub. No.: WO2020/008109
PCT Pub. Date: Jan. 9, 2020

(65) Prior Publication Data
US 2021/0112719 A1   Apr. 22, 2021

(30) Foreign Application Priority Data

Jul. 5, 2018   (FI) .................................... 20185622

(51) Int. Cl.
*A01D 43/063*       (2006.01)
*A01B 45/02*        (2006.01)
(Continued)

(52) U.S. Cl.
CPC .......... *A01D 43/0635* (2013.01); *A01B 45/02* (2013.01); *A01C 5/062* (2013.01);
(Continued)

(58) Field of Classification Search
CPC ............ A01D 43/0633; A01D 43/0635; A01D 43/0638; A01D 43/077; A01D 43/12;
(Continued)

(56) References Cited

U.S. PATENT DOCUMENTS

| 3,342,354 A | 9/1967 | Behr |
| 4,234,286 A | 11/1980 | Hamilton |
| (Continued) | | |

FOREIGN PATENT DOCUMENTS

| CA | 2530009 A1 | 6/2007 | |
| CA | 2469600 C | * 10/2012 | ............. A01C 15/14 |
| (Continued) | | | |

OTHER PUBLICATIONS

Supplementary European Search Report of EP application No. 19831401.5, mailed Feb. 18, 2022, 3 pages.
(Continued)

*Primary Examiner* — Tara Mayo
(74) *Attorney, Agent, or Firm* — Meunier Carlin & Curfman LLC

(57) ABSTRACT

The invention relates to a lawn maintenance machine comprising a container (10) and a movable wall (40), the movable wall (40) dividing the container (10) to a first storage (20) having a first length in a longitudinal direction, and a second storage (30) having a second length in the longitudinal direction, wherein the second storage (30) is placed rearward from the first storage (20), the lawn maintenance machine further comprising an actuator arrangement configured to move the movable wall (40) forward and backward in the longitudinal direction in order to increase and decrease, respectively, the volume of the second storage (30). The invention further relates to a method for taking care of a lawn or a turf. This invention further relates to a lawn maintenance method and a lawn maintenance system.

15 Claims, 12 Drawing Sheets

(51) Int. Cl.

| | |
|---|---|
| *A01C 5/06* | (2006.01) |
| *A01C 7/00* | (2006.01) |
| *A01D 34/44* | (2006.01) |
| *A01D 34/54* | (2006.01) |
| *A01D 34/66* | (2006.01) |
| *A01D 34/74* | (2006.01) |
| *A01D 43/077* | (2006.01) |
| *A01D 43/12* | (2006.01) |
| *A01D 43/14* | (2006.01) |
| *A01G 20/30* | (2018.01) |
| *B60P 1/00* | (2006.01) |
| *B60P 1/36* | (2006.01) |

(52) U.S. Cl.
CPC ............... *A01C 5/066* (2013.01); *A01C 7/00* (2013.01); *A01D 43/0638* (2013.01); *A01D 43/077* (2013.01); *A01D 43/12* (2013.01); *A01D 43/14* (2013.01); *A01G 20/30* (2018.02); *B60P 1/006* (2013.01); *B60P 1/36* (2013.01); *A01D 34/44* (2013.01); *A01D 34/54* (2013.01); *A01D 34/66* (2013.01); *A01D 34/74* (2013.01)

(58) Field of Classification Search
CPC ........ A01D 43/14; A01G 20/30; A01G 20/40; A01G 20/43; A01G 20/47; A01B 45/02; A01C 5/04; A01C 5/062; A01C 5/066; A01C 7/00; B60P 1/006; B60P 1/36
See application file for complete search history.

(56) References Cited

U.S. PATENT DOCUMENTS

| | | |
|---|---|---|
| 5,009,564 A | 4/1991 | Lutz |
| 5,152,128 A | 10/1992 | Stoican |
| 5,533,577 A | 7/1996 | Jucker |
| 6,131,830 A * | 10/2000 | Jones ..................... A01C 15/18 239/654 |
| 6,817,551 B2 * | 11/2004 | Williams et al. .... A01C 15/122 222/545 |
| 2011/0162855 A1 | 7/2011 | Vincel |
| 2012/0324853 A1 | 12/2012 | Rumpler |

FOREIGN PATENT DOCUMENTS

| | | |
|---|---|---|
| DE | 202014105316 U1 | 11/2014 |
| GB | 674914 A | 7/1952 |
| GB | 2146214 A | 4/1985 |
| GB | 2424166 A | 9/2006 |
| JP | H0582664 U | 11/1993 |
| JP | 06007001 | 1/1994 |
| JP | 2000016142 A | 1/2000 |
| JP | 200116949 | 1/2001 |
| JP | 2005112152 | 4/2005 |
| JP | 2010166887 A | 8/2010 |
| WO | 2014146683 A1 | 9/2014 |

OTHER PUBLICATIONS

Office action in the corresponding application JP201-522147. Issued Jun. 30, 2023. 4p. English machine translation included.

* cited by examiner longitudinal direction

LAWN MAINTENANCE MACHINE

PRIORITY

This application is a U.S. national application of the international application number PCT/FI2019/050496 filed on Jun. 25, 2019 and claiming priority of FI application number 20185622 filed on Jul. 5, 2018, the contents of both of which are incorporated herein by reference.

TECHNICAL FIELD

This invention relates to a lawn maintenance machine. The invention further relates to a method for maintenance a lawn or a turf. The invention further relates to a lawn maintenance method. The invention further relates to a lawn maintenance system.

BACKGROUND

Typically, several steps are needed for a lawn maintenance in order to achieve a good quality turf for example for a golf course. These steps may comprise, for example, aerating, seeding, fertilizing, pesticide spreading, topdressing, verticutting, brushing, rolling and mowing.

SUMMARY

Aspects of the invention are characterized by what is stated in the independent claims. Various embodiments of the invention are disclosed in the dependent claims.

According to a first aspect, there is provided a lawn maintenance machine comprising
  a container, and
  a movable wall,
  the movable wall dividing the container to a first storage having a first length in a longitudinal direction, and a second storage having a second length in the longitudinal direction, wherein the second storage is placed rearward from the first storage,
  the lawn maintenance machine further comprising
  an actuator arrangement configured to move the movable wall forward and backward in the longitudinal direction in order to increase and decrease, respectively, the volume of the second storage.

Preferably, the container comprises a first conveyor, most preferably a bottom conveyor, which first conveyor is configured to convey material from the container rearward and/or frontward, most advantageously both rearward and frontward.

In an embodiment, the movable wall is configured to move rearward while driving the lawn maintenance machine in order to increase the first surface area of the first storage and decrease the second surface area of the second storage.

In an embodiment, the movable wall is configured to has at least a first position and a second position, which between the movable wall can be moved, preferably freely or substantially freely.

In an embodiment, the first length of the first storage is at least 40% smaller than the second length of the second storage in said first position, and the second length of the second storage is at least 40% smaller than the first length of the first storage in said second position.

Advantageously, the first conveyor extends rearward from the container.

In an embodiment, the first storage comprises a first openable hatch for unloading the first storage. Advantageously, the first hatch is configured to open when the first conveyor is conveying material frontward.

In an embodiment, the second storage comprises a second openable hatch for unloading the second storage. Preferably, the second hatch is configured to open when the first conveyor is conveying material rearward.

In an embodiment, the lawn maintenance machine comprises
  an aerator and/or a verticutter, and
  a suction apparatus,
  and the suction apparatus is integrated with the apparatus(es) in order to collect material(s) removed from the surface of turf or lawn.

Preferably, the lawn maintenance machine comprises at least one of the following means, more preferably at least two of the following means:
  a spreader for topdressing,
  a finishing roll,
  a brush,
  a seeder, and/or
  a mower.

Preferably, the lawn maintenance machine comprises
  a first conveyor, and
  at least one of the following means:
  a seeder,
  an aerator,
  a verticutter and/or
  a suction apparatus,
  and the first conveyor extends rearward from at least one of the mentioned means.

According to a second aspect, there is provided a method comprising the lawn maintenance machine, wherein the method comprises:
  moving the movable wall rearward while driving the lawn maintenance machine on lawn or turf.

According to a third aspect, there is provided a lawn maintenance method comprising two lawn maintenance machines, i.e., first lawn maintenance machine and second lawn maintenance machine, wherein the method comprises:
  unloading at least some material from the first storage of the container of the first lawn maintenance machine in to the first storage of the container of the second lawn maintenance machine.

According to a third aspect, there is provided a lawn maintenance system comprising two lawn maintenance machines,
  wherein the system further comprises:
  a second conveyor of the first lawn maintenance machine, which second conveyor is configured to convey at least some material from first storage of the first lawn maintenance machine in to the second storage of the second lawn maintenance machine.

The novel lawn maintenance machine can be used to achieve eco-friendly solution, which may use lower amounts of seeds, fertilizers and/or other compounds.

Further, the novel lawn maintenance machine may save total fuel usage and other costs because it can be used to replace several conventional lawn maintenance machines. Hence, the lawn maintenance machine can be configured to perform a plurality of turf or lawn maintenance jobs, even while mowing.

The novel lawn maintenance machine may provide lowered investment costs, lowered emissions, lowered energy consumption and an efficient work comprising, further, less trampling of the maintained turf or lawn.

Further, the novel lawn maintenance machine can be a cost-effective solution providing improved maintenance quality of the turf or lawn surface.

Figure 1A:
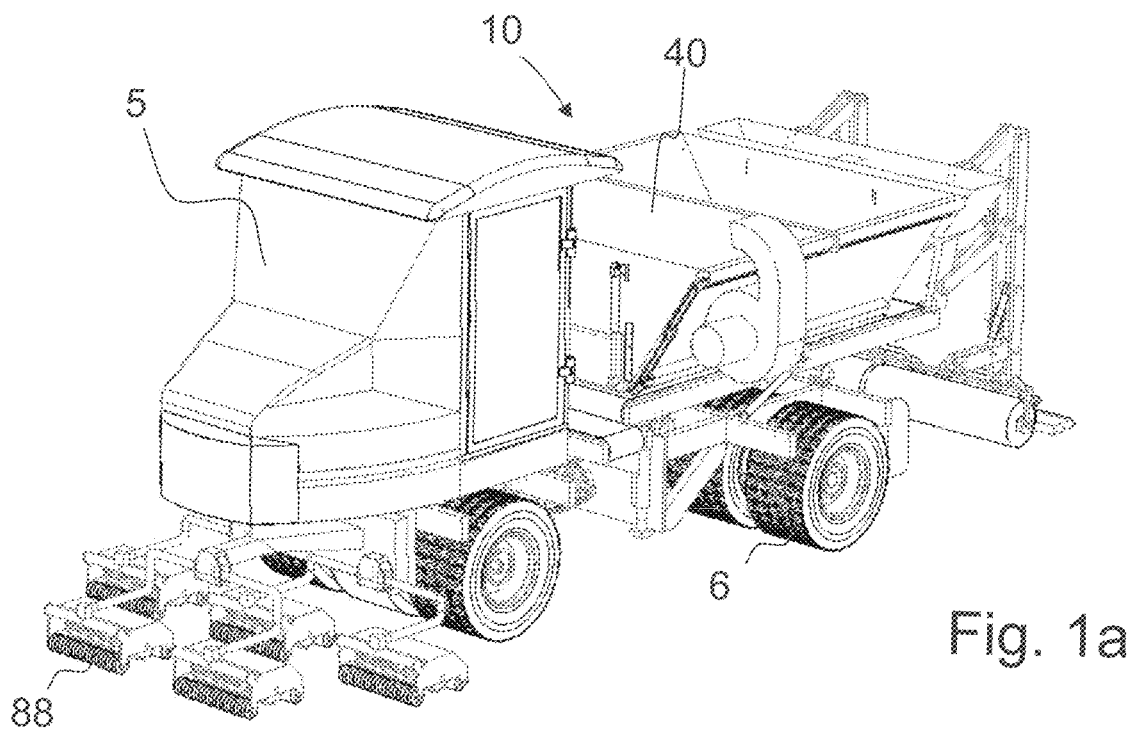
FIGS. 1a-b show, by way of an example, a front-side perspective view of a lawn maintenance machine.
Figure 1B:
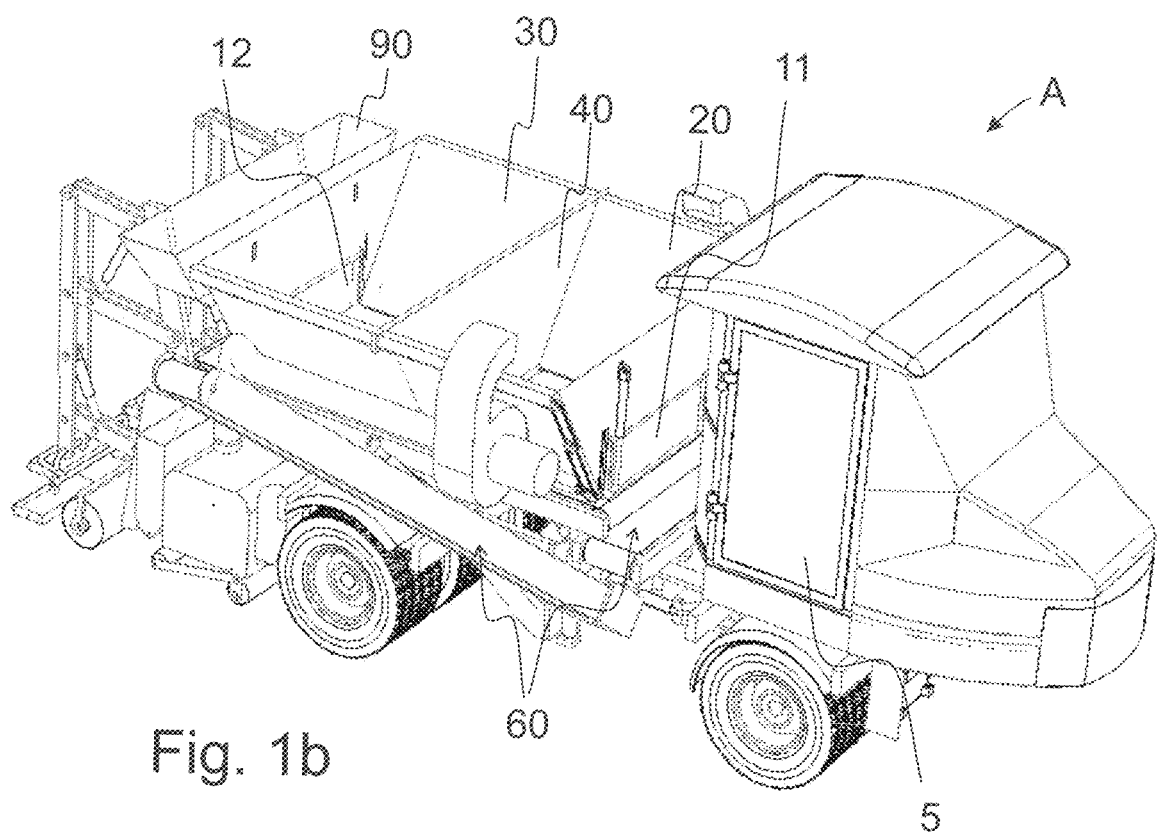
Figure 2A:
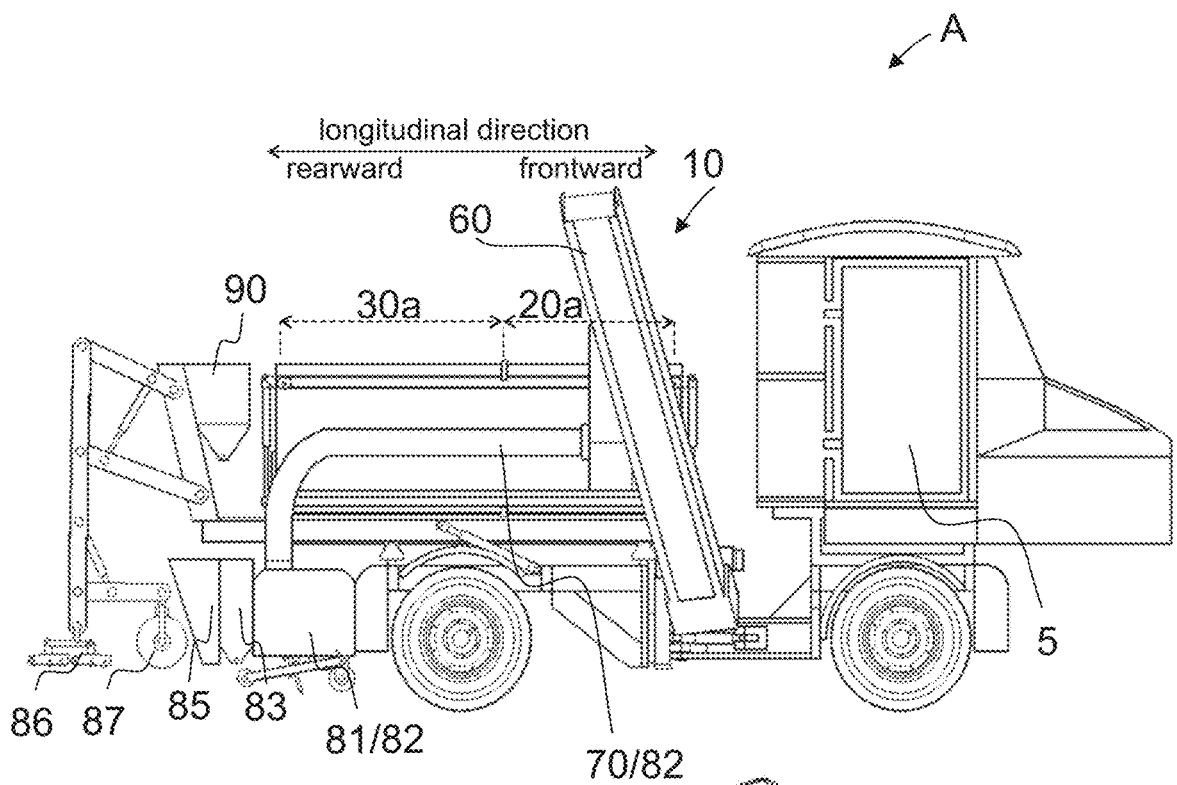
FIG. 2a shows, by way of an example, a side perspective view of a lawn maintenance machine.
Figure 2B:
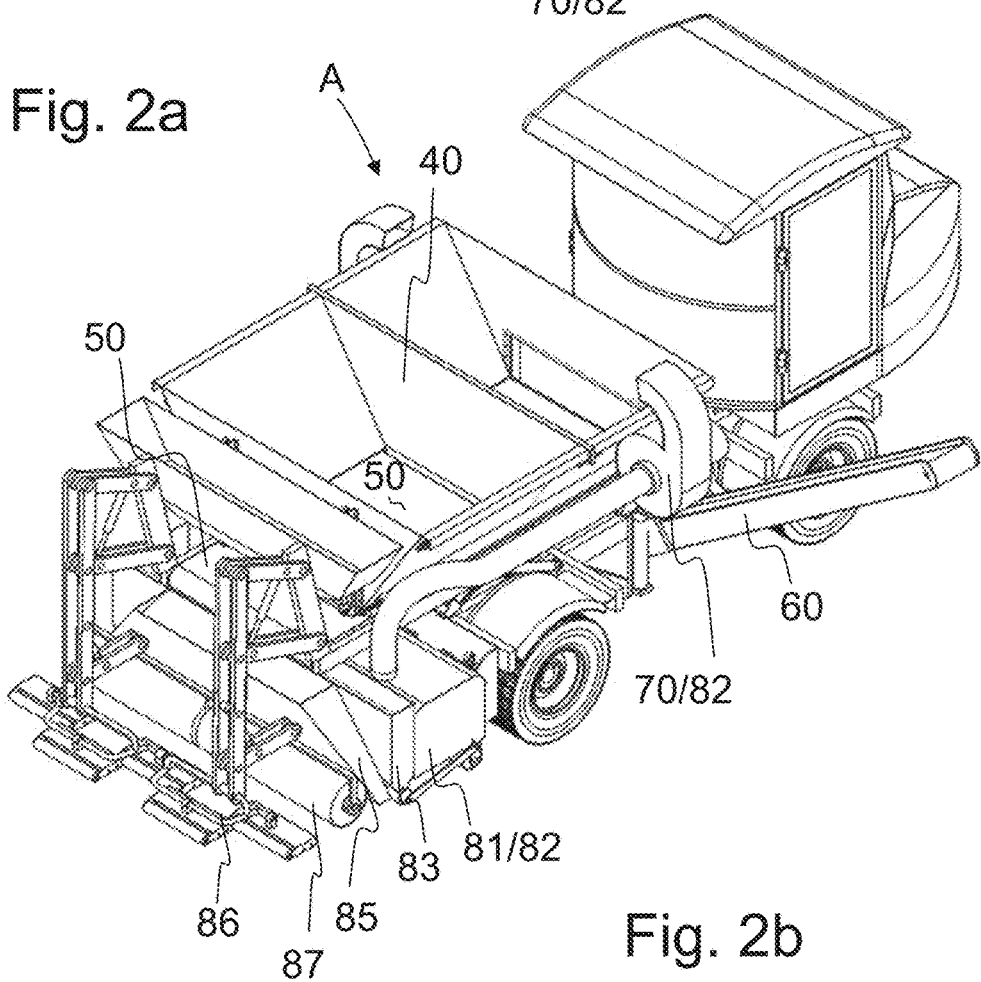
FIG. 2b shows, by way of an example, a rear-side perspective view of a lawn maintenance machine.
Figure 3:
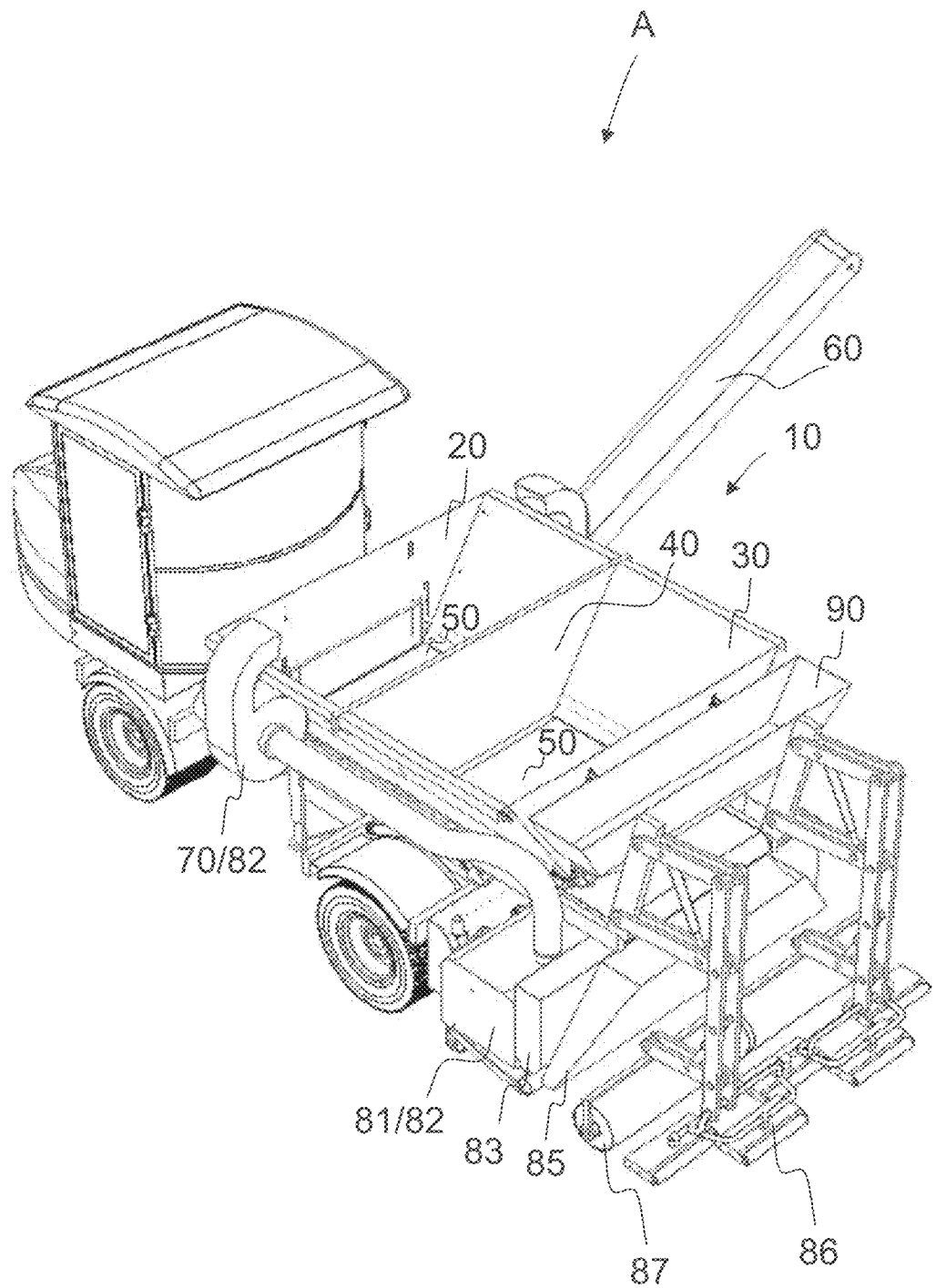
FIG. 3 shows, by way of an example, a rear-side perspective view of a lawn maintenance machine, having an opposite side perspective view to FIG. 2b

The drawings are schematic.

DETAILED DESCRIPTION

The following reference numbers are used in this application:
A,B a lawn maintenance machine,
A first lawn maintenance machine,
B second lawn maintenance machine,
5 a cabin for a worker,
6 a wheel of the lawn maintenance machine,
10 a container of the lawn maintenance machine,
11 first hatch of the container of the lawn maintenance machine,
12 second hatch of the container of the lawn maintenance machine,
20 first storage of the container of the lawn maintenance machine,
20a first longitudinal direction of the first storage,
30 second storage of the container of the lawn maintenance machine,
30a second longitudinal direction of the second storage,
40 a movable wall of the lawn maintenance machine,
41 upper supporting means of the movable wall of the lawn maintenance machine,
41a first upper supporting means of the movable wall,
41b second upper supporting means of the movable wall,
42 lower supporting means of the movable wall of the lawn maintenance machine,
42a first lower supporting means of the movable wall,
42b second lower supporting means of the movable wall,
43 an upper transferring belt of the movable wall of the lawn maintenance machine,
43a first upper transferring belt of the movable wall,
43b second upper transferring belt of the movable wall,
44 lower (transferring) belt of the movable wall of the lawn maintenance machine,
44a first lower transferring belt of the movable wall,
44b second lower transferring belt of the movable wall,
45 a pulley for the transferring belt of the movable wall,
46 a lower steering bar for the transfer means of the movable wall,
47 an upper steering bar for the transfer means of the movable wall,
48 a connecting belt,
50 first conveyor of the lawn maintenance machine,
60 second conveyor of the lawn maintenance machine,
70 first conduit member of a suction apparatus of the lawn maintenance machine,
80 means for caring a surface of turf or lawn,
81 an aerator or a verticutter of the lawn maintenance machine,
82 a suction apparatus of the lawn maintenance machine,
83 a seeder of the lawn maintenance machine,
85 a spreader of the lawn maintenance machine,
86 finishing rolls of the lawn maintenance machine,
87 a brusher of the lawn maintenance machine,
88 a mowing unit of the lawn maintenance machine,
90 a feeding container for solid fertilizing material
B a second lawn maintenance machine,
B10 a container of the second lawn maintenance machine
B20 first storage of the container of the second lawn maintenance machine,
B30 second storage of the container of the second lawn maintenance machine
B40 a movable wall of the second lawn maintenance machine,
B50 a first conveyor of the second lawn maintenance machine, and
B60 a second conveyor of the second lawn maintenance machine.

In this application, the term "lawn maintenance machine" refers to motorised, ride-on type lawn maintenance machine guided by an individual. The lawn maintenance machine is an outdoor working machine.

In this application, the term "a surface area" refers to "a bottom area" of a storage, which can be calculated as length of the storage×width of the storage.

The term "length" refers to a longitudinal direction of the lawn maintenance machine.

In this application, the term "movable wall" refers to a movable wall 40 that is placed in to a container of the lawn maintenance machine A,B. The movable wall 40 divides the container 10 into separated storages 20,30. The movable wall preferably extends from the left side of the container to the right side of the container.

In an embodiment, the first lawn maintenance machine is configured to do several maintenance jobs in one go, and the second lawn maintenance machine is configured at least to unload topdressing(s) or other material(s) from the container of the second lawn maintenance machine to the container of the first lawn maintenance machine, and to load other material(s) (removed from turf or lawn) from the container of the first lawn maintenance machine to the container of the second lawn maintenance machine.

Taking care of turf or lawn may need several steps. For example, airing, seeding, fertilizing, pesticide spreading, top dressing and mowing may be used to achieve good quality turf or lawn for customers.

Conventionally, one type of machine is usually used for each job. This may stress the turf or lawn. Further, in order to maintenance golf course, football field etc., several people and lots of time is needed for every time the turf or lawn is cared. This is very expensive, because it requires many workers as well as many kinds of components.

FIGS. 1-4a illustrate a lawn maintenance machine.

The lawn maintenance machine A,B is preferably used for a turf or lawn care, a golf course maintenance, a football field maintenance and/or another kind of lawn maintenance. Therefore, the lawn maintenance machine can preferably be configured for at least one of the followings;
  turf or lawn care,
  garden maintenance,
  football field maintenance,
  landscaping, and
  golf course maintenance.

Advantageously, the lawn maintenance machine A,B can be configured for golf course maintenance and football field maintenance.

The lawn maintenance machine A,B preferably comprises a cabin 5 for a worker. The cabin 5 is preferably placed on the front wheels of the lawn maintenance machine A,B. The cabin 5 advantageously comprises
  a seat having preferably two elbow rests, the seat being advantageously rotatable,
  driving means, such as
  a steering wheel, and/or
  one or two joysticks, and/or
  one or two sets of operating pedal(s),
  and
  a top above the seat.

The seat of the lawn maintenance machine A,B preferably rotates at least 180° and more preferably at least 270°. Most preferably, the seat rotates 360°. Therefore, it is easy to drive rearwards and forwards.

In an embodiment, the steering wheel and the operating pedal(s) rotate together with the seat. Therefore, the cabin does not need to have two sets of pedals and steering wheels. If the steering wheel and operating pedals(s) do not rotate together with the seat, the cabin preferably has two steering wheels and two sets of operating pedals.

Advantageously, one or two of the elbow rests of the cabin 5 comprise an integrated control panel.

The cabin 5 advantageously has two doors. Therefore, it is easy to exit the cabin, for example, in the case of emergency.

Advantageously, the lawn maintenance machine A,B comprises at least 5 wheels, for example from 6 to 12 wheels. More preferably, the lawn maintenance machine A, B comprises 6 to 11 wheels, most preferably 6 to 8 wheels, to achieve evenly distributed load onto the surface of the turf or lawn.

Figure 4A:
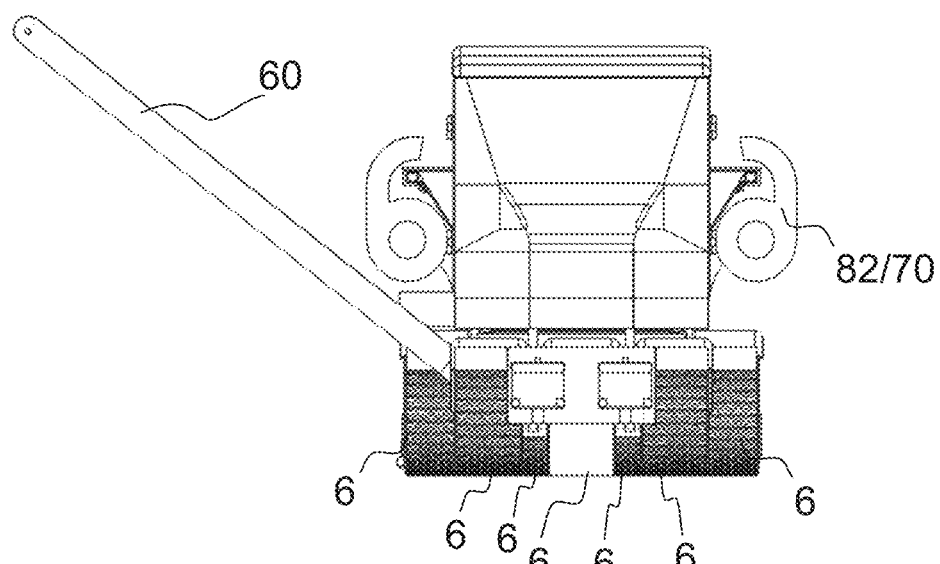
FIG. 4a shows, by way of an example, a lawn maintenance machine having several wheels (seven wheels in this example)
Figure 4B:
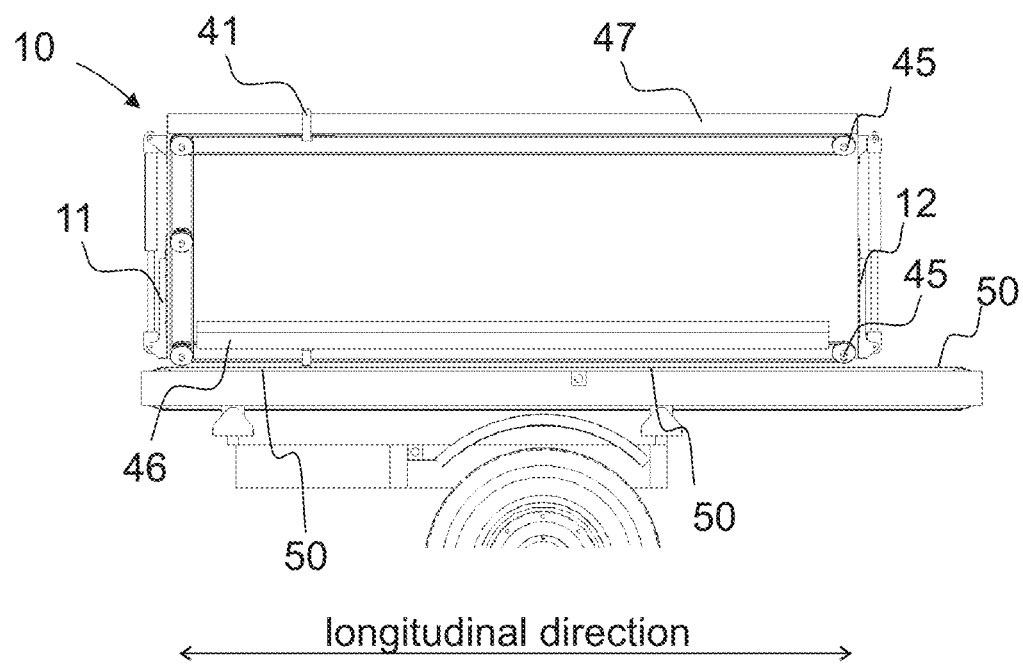
FIG. 4b shows, by way of an example, a side perspective view of a container having movable wall.
Figure 5A:
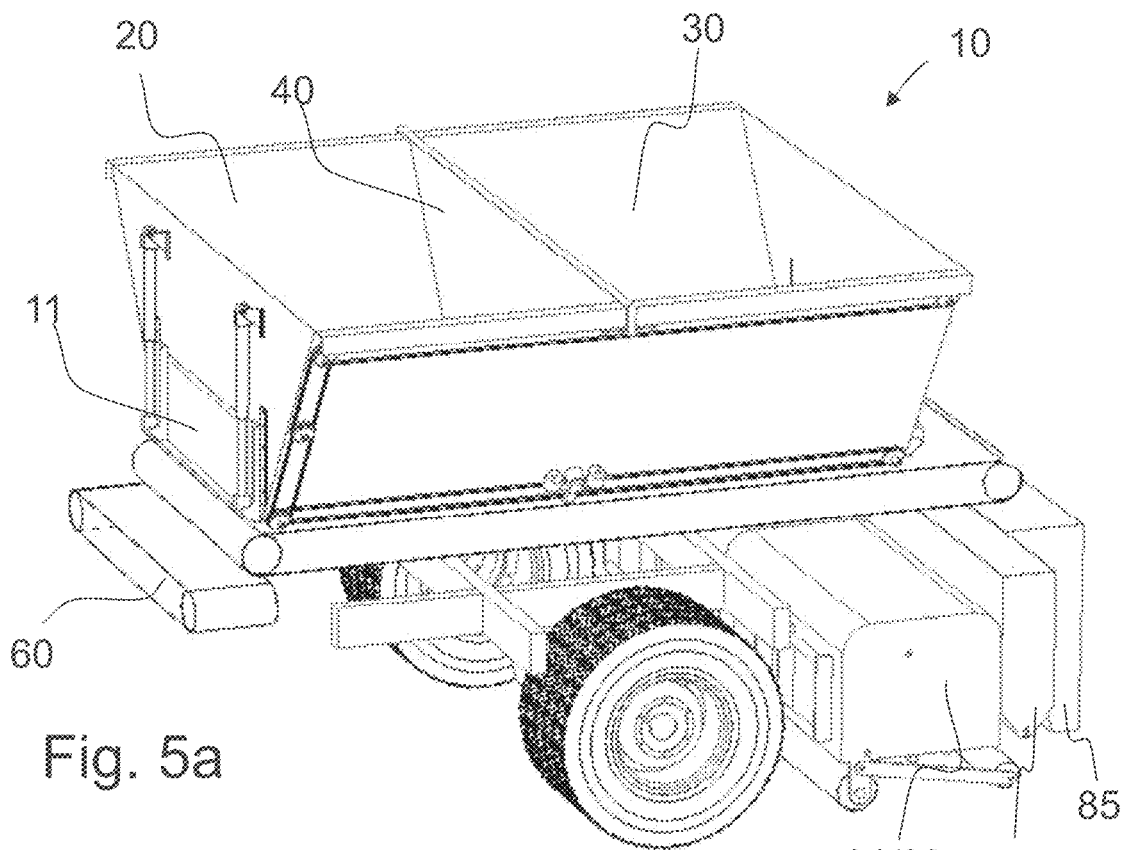
FIG. 5a shows, by way of an example, a rear-side perspective view of a container having movable wall, and some means for caring a surface of a turf or lawn, which means are at least partly placed under first conveyor of the container.
Figure 5B:
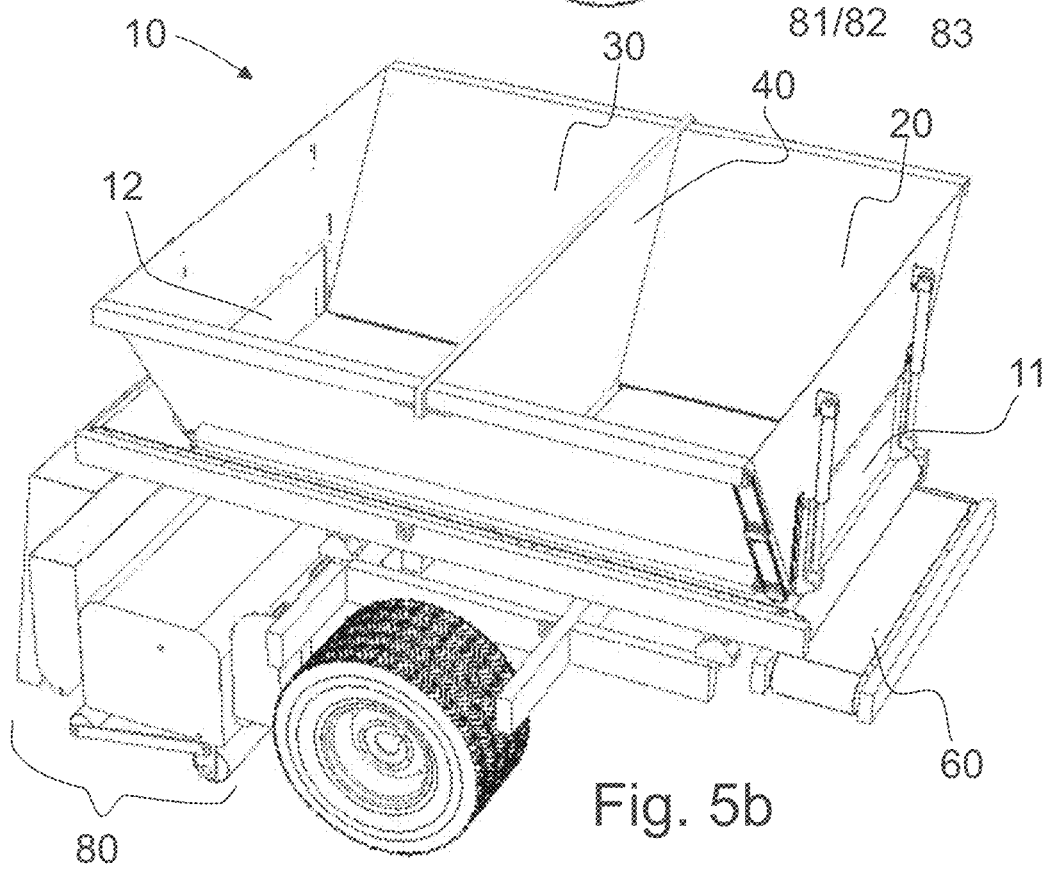
FIG. 5b shows, by way of an example, a front-side perspective view of a container having movable wall, having an opposite side perspective view to FIG. 5a, FIG. 6a shows, by way of an example, a front-side perspective view of a container having a movable wall.
Figure 12A:
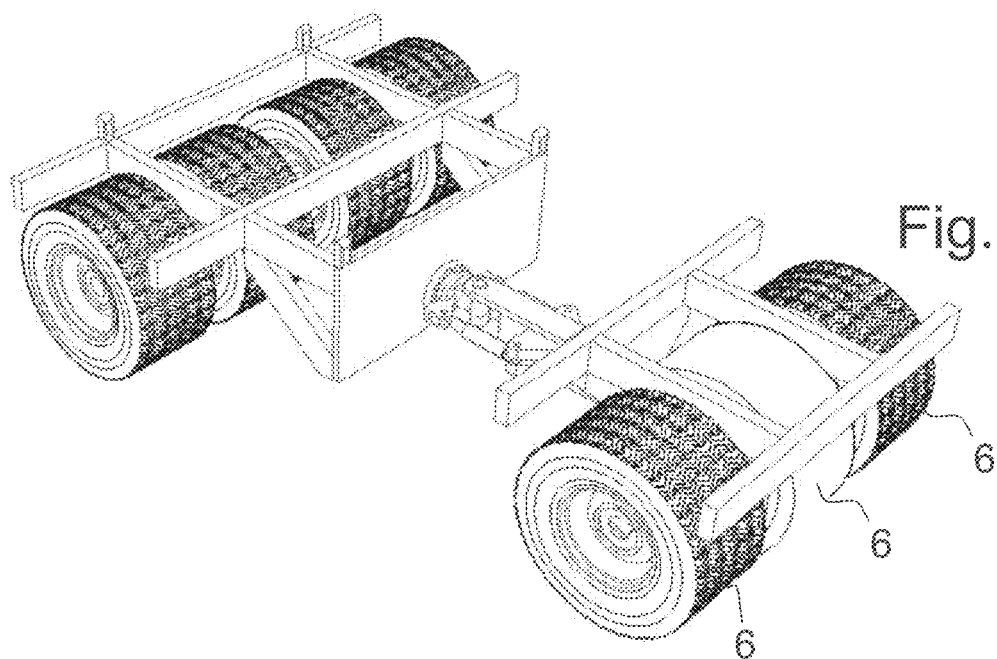
FIGS. 12a-b show, by way of an example, some example locations for several wheels of a lawn maintenance machine.
Figure 12B:
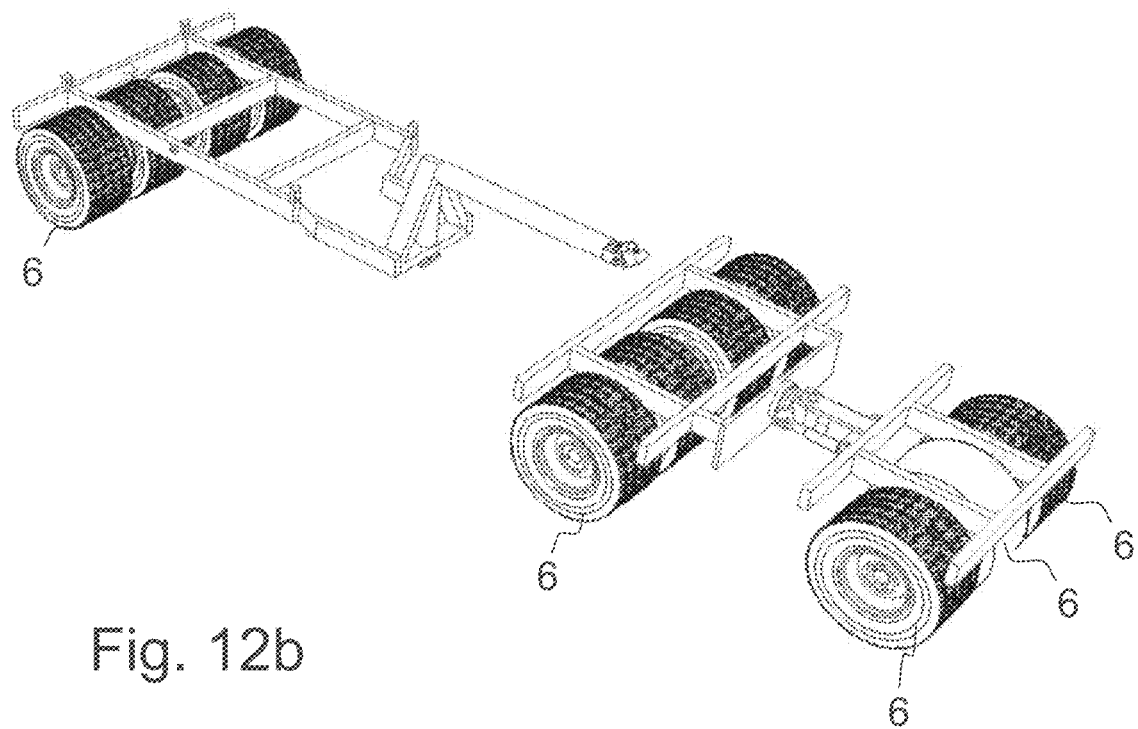

Preferably, the lawn maintenance machine A,B comprises wheel location patterns, wherein rear wheels follow the front wheels in such a way that the rear wheels are tracking the free space left by the front wheels (shown in FIGS. 4a, 12a, 12b). A technical effect is that, because of the wheel pattern, a load of the lawn maintenance machine may be evenly distributed, and the lawn maintenance machine is not leaving individual tire tracks.

The lawn maintenance machine B may have
  a front part having above mentioned wheel pattern, and
  a separate rear part comprising a container, wherein the rear part may have, for example, 4 extra wheels.

Therefore, the lawn maintenance machine has preferably between 5 and 10 driver wheels, most preferably six driver wheels (shown in FIG. 12a) or 10 driver wheels (shown in FIG. 12b).

Most advantageous, the method for maintenance turf or lawn comprises two lawn maintenance machines A,B, wherein the first lawn maintenance machine A has 7 wheels from which 6 are driver wheels (shown in FIG. 12a, driver wheels are darker than the other wheel). Furthermore, most advantageously the second lawn maintenance machine has a front having 7 wheels from which 6 are driver wheels and, also, a rear part having four wheels (shown in FIG. 12b)

The lawn maintenance machine may comprise a location-based system, such as a gps-system (global positioning system), for providing automatic steering helping a driver to have the exact locate. Hence, it may be possible to know exactly where and what should be done. Advantageously, the location-based system is used for mowing and/or providing data for seeding, fertilizing and/or pesticide spreading.

Advantageously, the lawn maintenance machine A,B comprises a container 10 having at least one movable wall 40. The movable wall 40 preferably divides the container 10 into separated storages 20,30.

Preferably, the container 10 comprises 2 to 4 storages, more preferably exactly two storages 20, 30. Advantageously, the lawn maintenance machine comprises the container 10 comprising two storages 20,30 separated by the movable wall 40. Therefore, the container 10 is divided into two storages 20, 30 separated from each other by the movable wall 40.

The first storage 20 of the container 10 is advantageously used for a material to be collected from the surface of the turf or lawn and transported away such as clippings, scarifies, verti-cuts, aeration pieces and the like. The second storage 30 of the of the container 10 is advantageously for a material to be applied on to the surface of the turf or lawn, such as topdressings.

Advantageously, the location of the movable wall 40 in the container 10 is changeable rearward and frontward. Further, surface areas and the longitudinal lengths 20a, 30a of the storages 20,30 of the container 10 change when the location of the movable wall 40 is changed.

Advantageously, the movable wall 40 is configured to have at least two positions, a first position and a second position, between which the movable wall 40 can be moved, preferably freely or substantially freely.

Advantageously, the movable wall 40 is configured to increase the longitudinal length 20a of the first storage 20 of the container 10 while decreasing the longitudinal length 30a of the second storage 30 of the container. Further, the movable wall 40 is configured to decrease the longitudinal length of the first storage 20 of the container 10 while increasing the longitudinal length of the second storage 30 of the container.

Figure 6A:
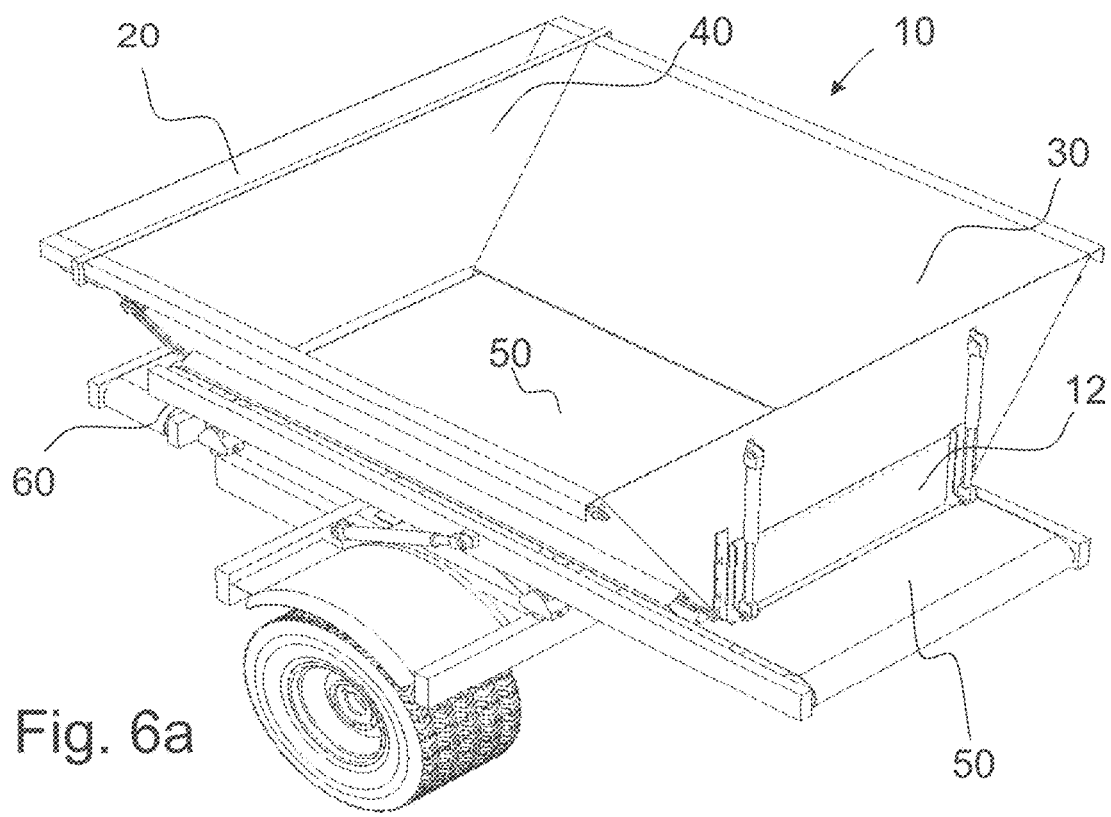
FIG. 6b shows, by way of an example, a top-side perspective view of a container having movable wall.
Figure 6B:
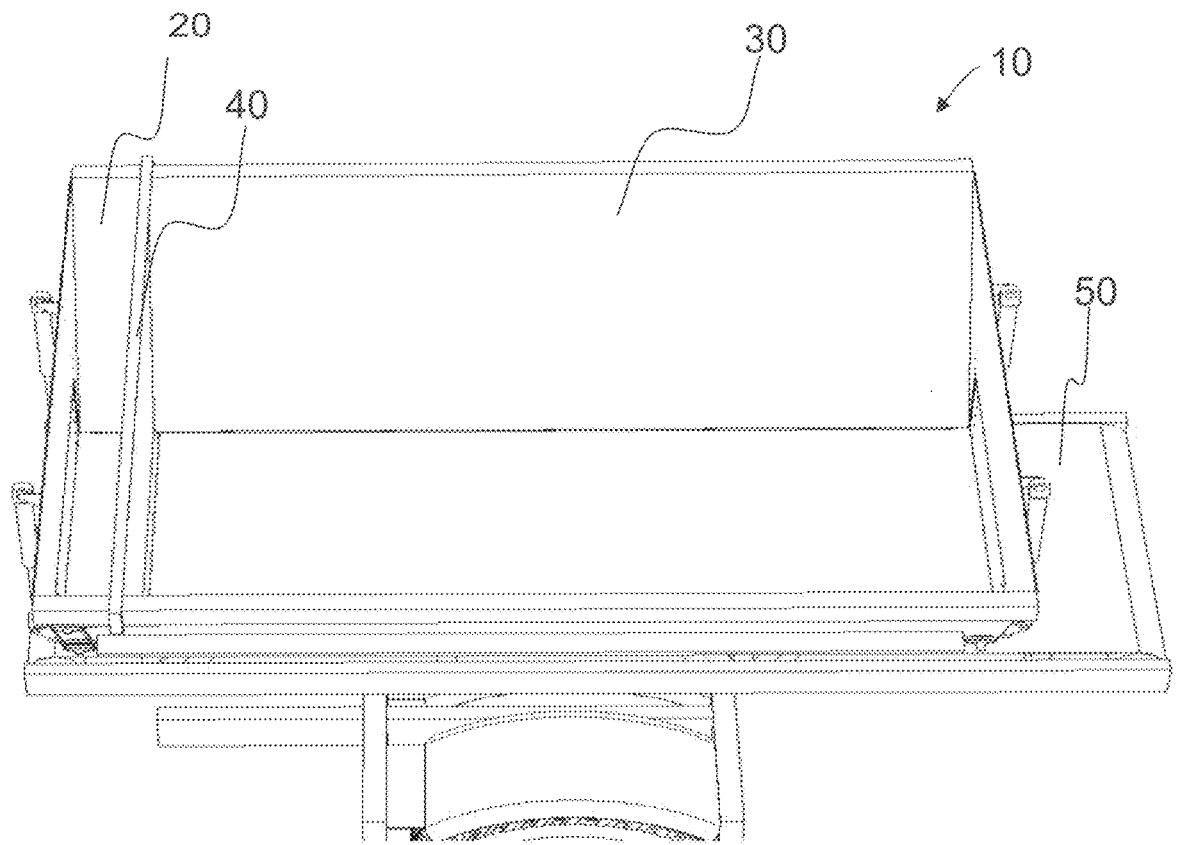
Figure 7A:
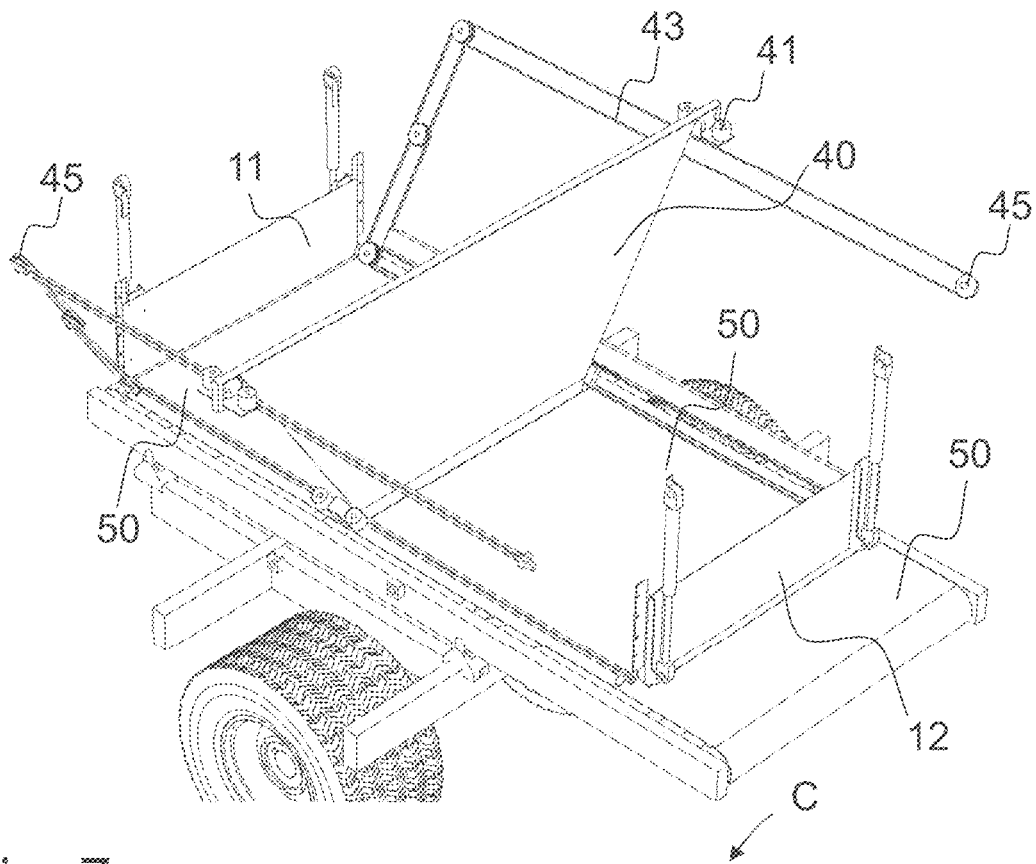
FIG. 7a shows, by way of an example, a rear-side perspective view of an example mechanism for a movable wall.
Figure 7B:
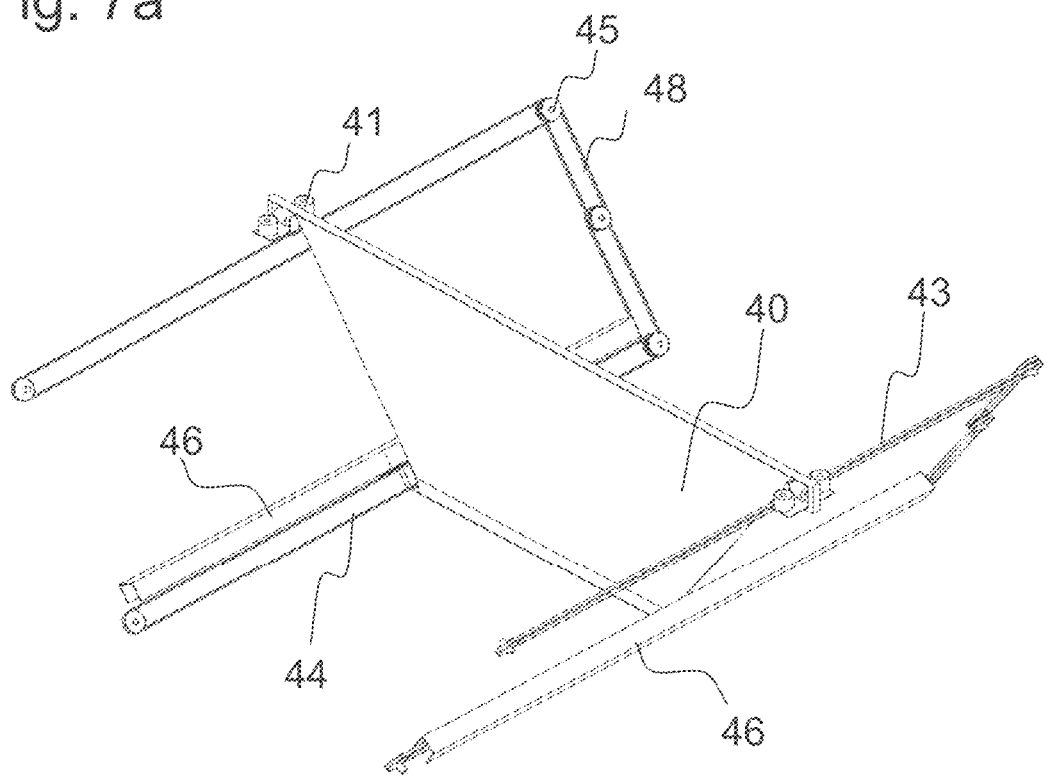
FIG. 7b shows, by way of an example, a rear-side perspective view of an example mechanism for a movable wall, having an opposite side perspective view to FIG. 7a, FIG. 8a shows, by way of an example, a top-side perspective view of an example mechanism for a movable wall, and a container comprising storages separated by the movable wall.
Figure 8A:
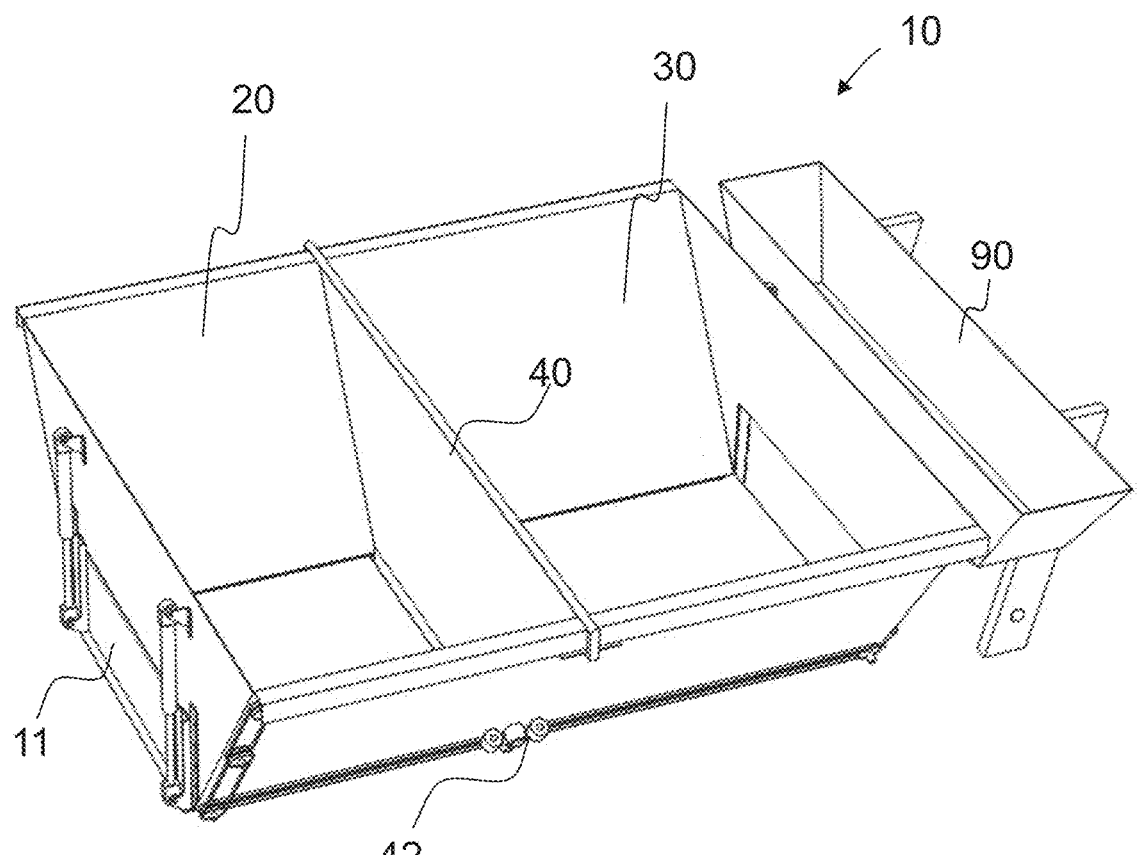
FIG. 8b shows, by way of an example, a front-side perspective view of an example mechanism for a movable wall, and a container comprising storages separated by the movable wall.
Figure 8B:
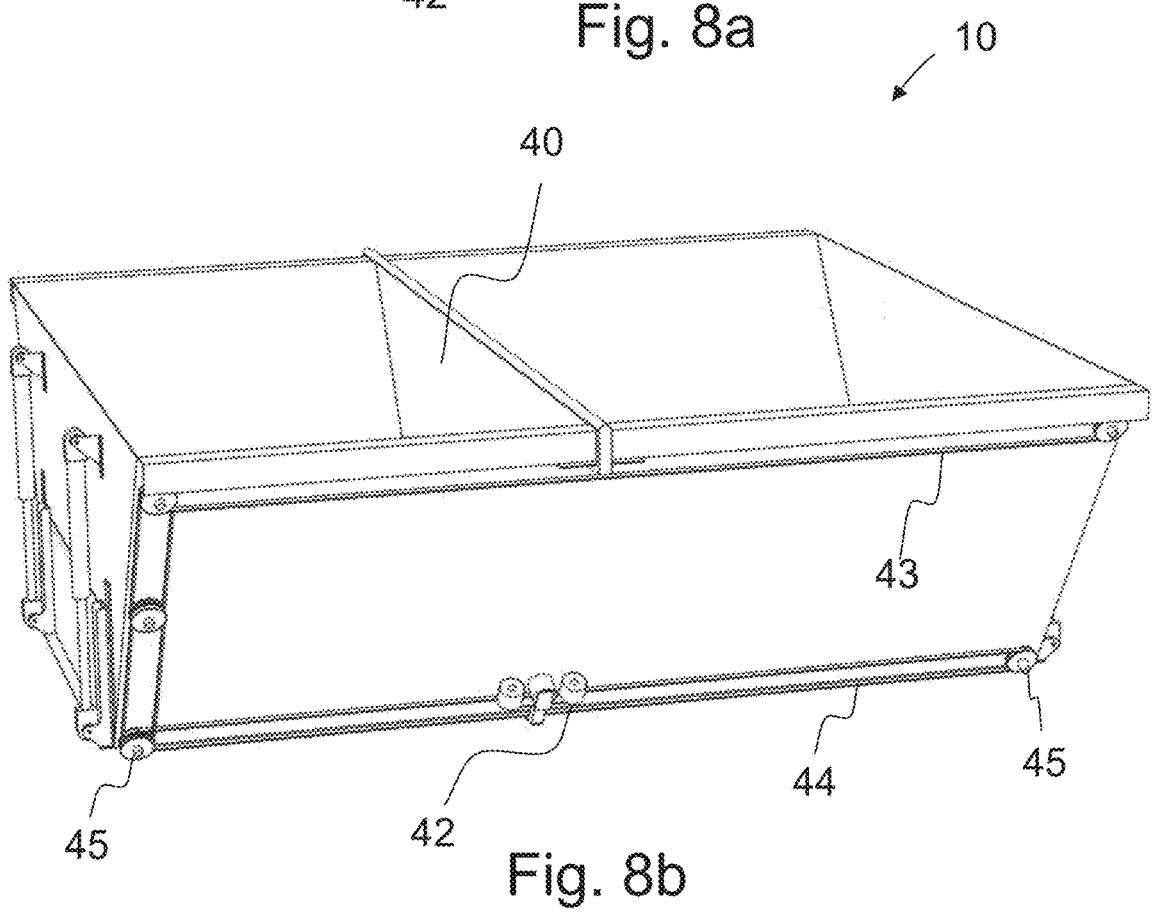

Advantageously, the movable wall 40 has a first position, wherein a surface area of the first storage 20 is smaller than a surface area of the second storage 30 (shown in FIGS. 6a-6b). Preferably, in said first position, the surface area of the first storage 20 is at least 40% smaller, more preferably at least 60% or at least 80% smaller than the surface area of the second storage 30.

Advantageously, the movable wall 40 has a second position, wherein a longitudinal length 30a of the second storage 30 is smaller than a longitudinal length 20a of the first storage 20. Preferably, in said second position, the longitudinal length of the second storage 30 is at least 40% smaller, more preferably at least 60% or at least 80% smaller than the longitudinal length of the first storage 20.

Therefore, the container 10 comprises the movable wall 40 dividing the container 10 into two storages 20,30, wherein the longitudinal lengths of the storages 20,30 are changed when the movable wall 40 is moved toward the first position of the movable wall or toward the second position of the movable wall 40.

Therefore, the first storage 20 and the second storage 30 have changeable surface areas and volumes. Thus, it may be possible to use only one container 10 for both the material to be added onto the turf or lawn and the material to be collected away from the turf or lawn.

A technical advantage for the movable wall 40 is that two separated containers of the lawn maintenance machine A,B may not be needed but one container can be used for both the matter to be collected away from the turf or lawn and the matter to be added onto the turf or lawn. Further, the container 10 of the lawn maintenance machine may be quite small and still be able to carry both the matter to be collected away from the turf or lawn and the matter to be added onto the turf or lawn.

The container 10 of the lawn maintenance machine A,B may comprise at least one movable wall 40, for example one, two or three movable walls. If the container 10 comprises more than one movable wall 40, it may be possible to carry and add different kinds of materials onto the turf or lawn in one go. However, it may be most advantageous if the container 10 comprises exactly one movable wall 40. In this case, it may be easier to provide an efficiently working structure for the container 10 of the lawn maintenance machine.

The lawn maintenance machine A,B preferably comprises a conveyor(s) 50, 60, such as a tube conveyor(s) and/or a belt conveyor(s), to convey the material to be loaded into the container 10 and/or to unload the material to be discharged from the container 10.

Advantageously, the lawn maintenance machine A,B comprises a first conveyor 50 in order to unload the container 10 from the material placed into the container 10. Advantageously, the first conveyor 50 is a belt conveyor, most preferably a bottom conveyor.

The first conveyor 50 is preferably positioned to extend at least from the front of the first storage 20 to the rear of the second storage 30. Furthermore, most advantageously the first conveyor 50 extends rearward from the container 10. Furthermore, the first conveyor 50 preferably extends frontward from the first storage 20.

The first conveyor 50 is preferably used to unload materials from the first storage 20 of the container 10 of the lawn maintenance machine. Further, the first conveyor 50 is preferably used to unload materials from the second storage 30 of the container 10. Thus, the first conveyor 50 is advantageously configured to unload material(s) from the first storage 20 of the container 10 and from the second storage 30 of the container 10.

Advantageously, the first conveyor 50 is configured to move material to a first direction and to a second direction. Advantageously, said first direction is towards the rear side (rearward) of the lawn maintenance machine and the second direction is an opposite direction, i.e. towards the front side (frontward) of the maintenance machine.

Figure 10A:
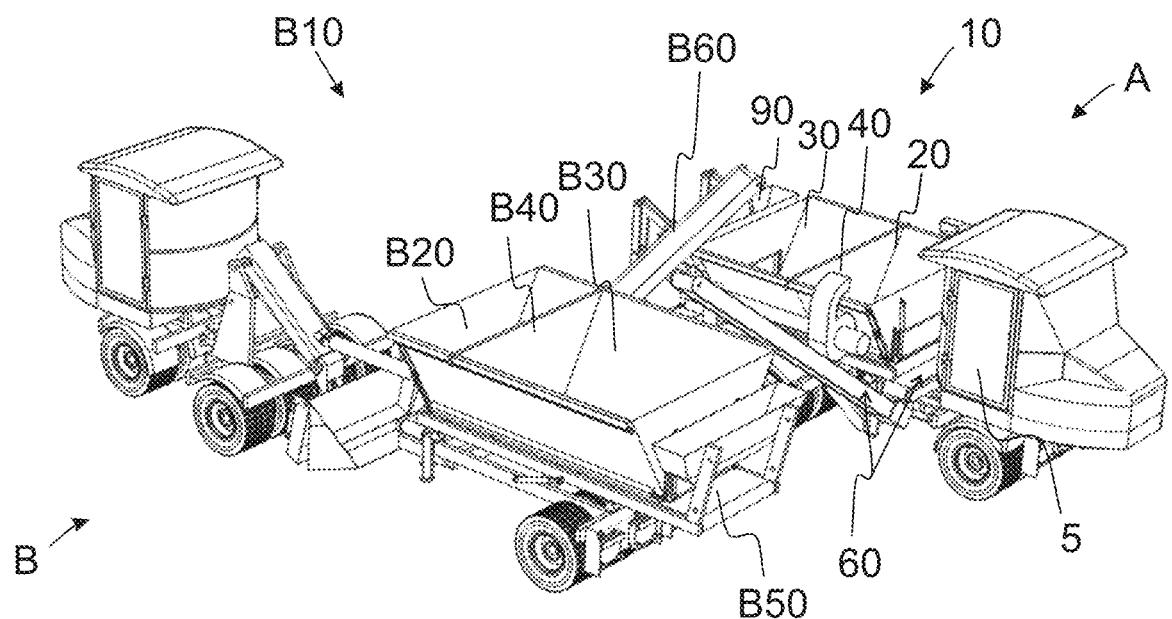
FIGS. 10a-b show, by way of an example, a first lawn maintenance machine and a second lawn maintenance machine.
Figure 10B:
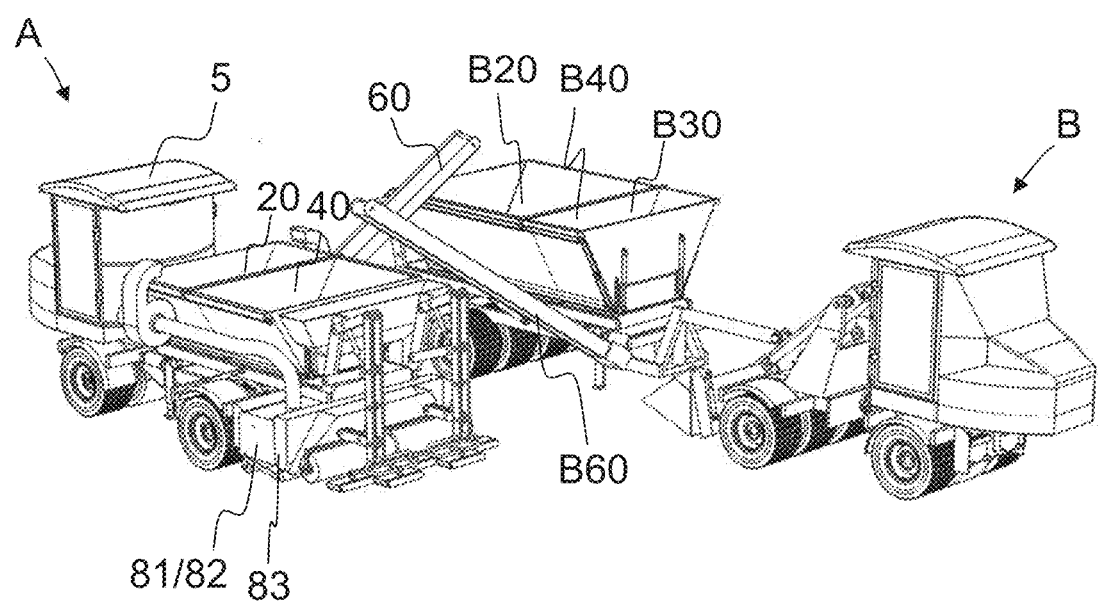

Most advantageously, the first conveyor 50 is configured
- to move material to be applied on to the turf or lawn rearward, and
- to move material to be unload from the container 10 of the first lawn maintenance machine to a container of second lawn maintenance machine forward (shown in FIGS. 10a-b).

Advantageously, the material to be applied on to the turf or lawn, such as topdressing, is moved to a first direction (i.e. rearward) by a first conveyor 50 in order to apply said material, such as topdressing, on to the turf or lawn.

Advantageously, the movable wall 40 is moved to the first direction (rearward) when the material is applied on to turf or lawn from the second storage 30 of the container 10. Due to said movement of the movable wall 40, a volume (and a longitudinal length 20a) of the first storage 20 having the material to be collected from the turf or lawn is typically increased while a volume (and a longitudinal length 30a) of the second storage 30 is decreased.

Advantageously, in order to unload material(s), such as aeration pieces and the like, from the first storage 20 of the lawn maintenance machine A, the material is moved to a second direction (i.e., frontward) by a first conveyor 50 in order to unload the material from the first storage.

Advantageously, the movable wall 40 is moved to the second direction (forward) when the material is unloaded from the first storage 20. Further, due to said movement of the movable wall 40, the volume (and longitudinal length 20a) of the first storage 20 having the material to be collected from the turf or lawn is typically decreased while the volume (and longitudinal length 30a) of the second storage 30 is increased.

Preferably, the container 10 of the lawn maintenance machine A,B comprises at least one hatch 11,12. Advantageously, the container 10 comprises at least two hatches 11,12. Preferably, the container 10 comprises at least one, more preferably exactly one, hatch 11,12 for each of the storages 20,30. The hatches 11,12 are preferably used to unload the material from the container 10 when a first conveyor 50 is conveying material out of the container 10. Most preferably, (at least) the second storage 30 of the container of the lawn maintenance machine comprises the hatch 12.

Preferably, the first storage 20 of the container 10 comprises a first hatch 11 and the second storage 30 comprises a second hatch 12. Advantageously, the first hatch and the second hatch 11,12 operate hydraulically.

Advantageously, the first storage 20 has the first hatch 11, preferably situated at a front wall of the first storage 20. Advantageously, the first hatch 11 of the first storage 20 is configured to open while unloading the first storage. The first hatch 11 is preferably used to unload the collected material from the first storage 20, when the first conveyor 50 is moved to a second direction in order to unload the material to be transported away from the container 10. Hence, advantageously the first hatch 11 of the first storage 20 is configured to open when the first conveyor 50 is conveying material forward.

Advantageously, the second storage 30 has a second hatch 12, preferably situated at a rear wall of the second storage 30. Advantageously, the second hatch 12 of the second storage 30 is configured to open while unloading the second storage 30. The second hatch 12 is preferably used to unload the material to be applied on to turf or lawn from the second storage 30, when the first conveyor is moved to a first direction (rearward) by a first conveyor 50 in order to apply the material onto the turf or lawn. Hence, advantageously the second hatch 12 of the second storage 30 is configured to open when the first conveyor 50 is conveying material rearward. Advantageously, the first conveyor 50 extends rearward from the container 10.

Advantageously, the first hatch 11 and the second hatch 12 are both openable. The second hatch 12 is preferably open when unloading the second storage 30. Further, the first hatch 11 is preferably open when unloading the first storage 20.

The lawn maintenance machine preferably comprises a second conveyor 60 to convey the material unloaded from the container 10 further, for example, from a first storage of one lawn maintenance machine to a second storage of another lawn maintenance machine (shown in FIG. 10). Therefore, the second conveyor 60 is preferably configured to unload material from the container 10 of the lawn maintenance machine, most preferably from the first storage 20 of the lawn maintenance machine A, B (shown in FIGS. 10a-b).

The second conveyor 60 may consists of several parts, for example, a first part of the second conveyor 60 may be placed frontward from the first conveyor, preferably at least partly below the first conveyor 50, in order to feed the material from the first conveyor 50 to the second conveyor 60. Further, a second part of the second conveyor 60 may be configured to move material(s) from the first part of the second conveyor 60.

The second conveyor of the first lawn maintenance machine may convey material from the first storage of the first lawn maintenance machine to a container B10 of the second lawn maintenance machine B via said second part of the second conveyor 60 (shown in FIGS. 10a-b). Alternatively or in addition, the second conveyor of the second lawn maintenance machine may convey material, for example, from the first storage of the second lawn maintenance machine to a container B10 of the first lawn maintenance machine via said second part of the second conveyor 60 (shown in FIGS. 10a-b).

The second lawn maintenance machine B may be used as a transporter for topdressing and material(s) to be conveyed away.

Advantageously, the material to be conveyed away from the first storage 20 is conveyed to the second direction (frontward) by the first conveyor 50 in order to unload material(s) from the container 10 via the second conveyor 60. Advantageously, also the movable wall 40 is moved to the second direction when the material to be transported away is conveyed from the container 10. Further, the first hatch 11 is preferably open when unloading the first storage 20.

Figure 11A:
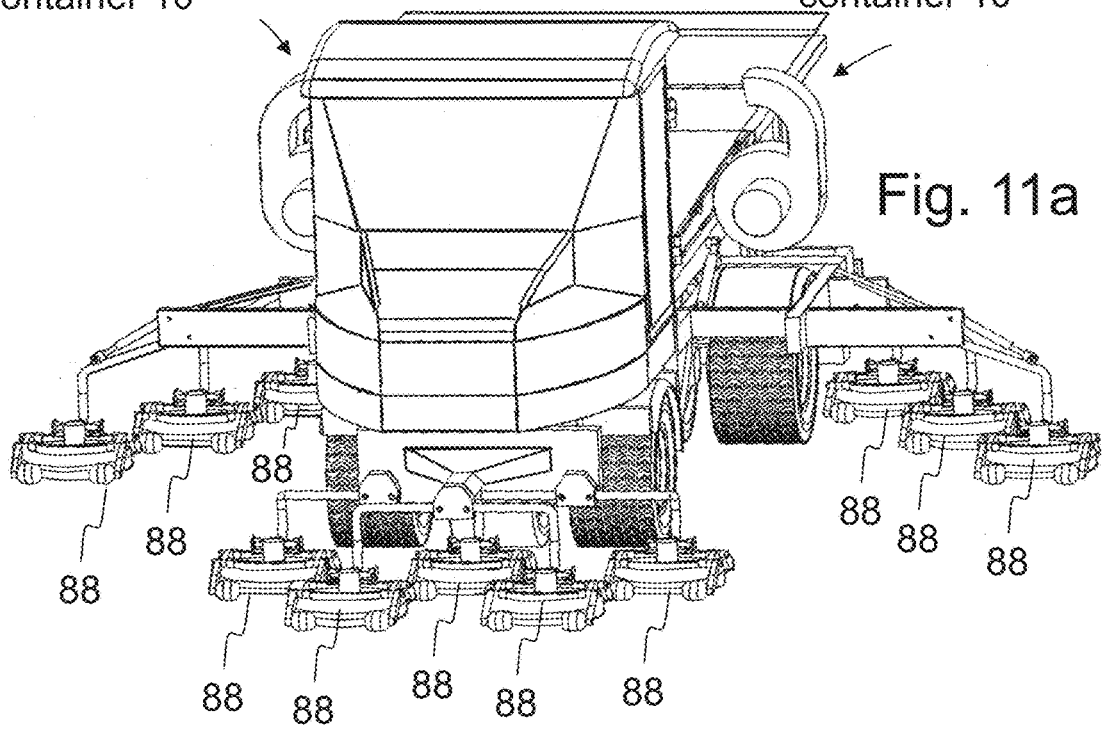
FIGS. 11a-b show, by way of an example, a lawn maintenance machine having several mowing units.
Figure 11B:
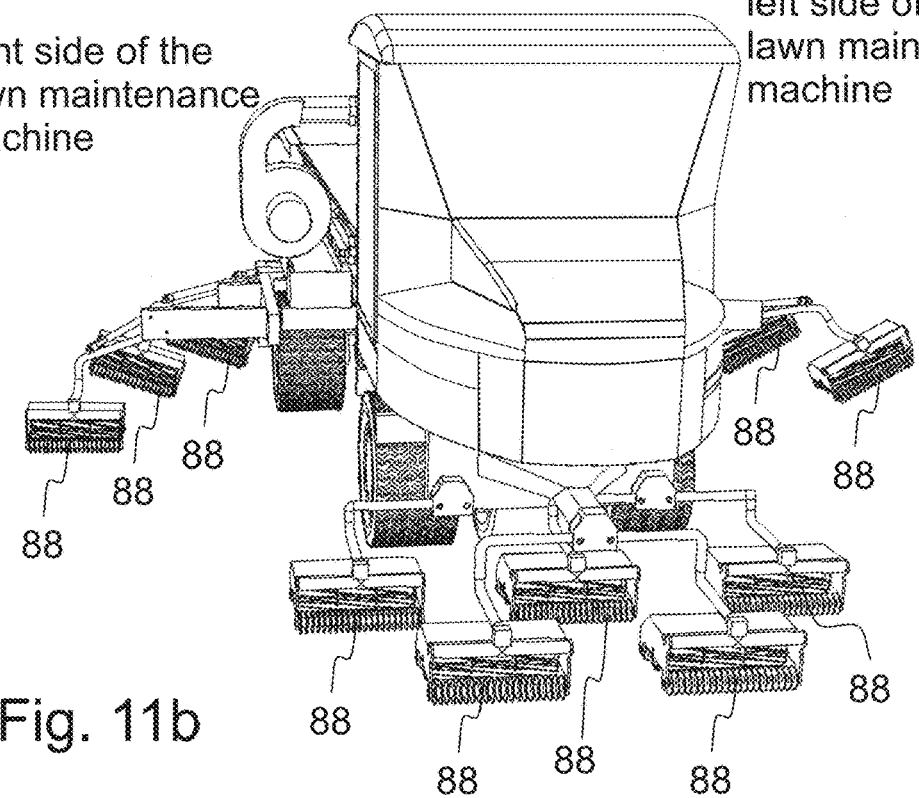

Advantageously, the lawn maintenance machine A,B has a mowing unit 88. More preferably, the lawn maintenance machine has several mowing units, for example from 3 to 12 mowing units, such as 5 or 11 mowing units, to achieve good mowing results of the cared turf or lawn (shown in FIG. 1 a). In an embodiment, the lawn maintenance machine has 5 front mowing units at front and 6 rear mowing units located rearward from said front mowing units (shown in FIGS. 11a-b).

Advantageously, the mowing units 88 or at least some of the mowing units are positioned so as to be in close proximity to the turf or lawn to be managed. Preferably, a mowing unit is adjustable in height in the range of 3 to 70 mm from a turf or lawn surface, for example between 3 and 25 mm or between 30 and 70 mm.

Preferably, the mowing unit 88 comprises a reel mowing unit having a mowing height between 3 and 25 mm and/or a rotary mowing unit having mowing height between 30 and 70 mm.

At least some, preferably all, mowing units are advantageously movable on horizontal direction in order to change the area to be mowed. This has an advantage that mowing units may be located so that topdressing will not have an effect on the blades of the mowing unit. Preferably the mowing width (a width of the mowing area) of the lawn maintenance machine is between 2 and 8 m, more preferably between 2.5 and 6.0 m.

After the mowing, the mowed surface is advantageously passed over with a suction apparatus 82 (vacuum) to remove the cut grass from the turf or lawn.

Preferably, the lawn maintenance machine A,B comprises an aerator 81. Advantageously, the aerator 81 is used to aerate a surface of turf or lawn. Without a proper aeration, turfgrass roots may grow within the thatch layer rather than extending into the soil profile. This may make the turfgrass more susceptible to drought, heat and other stresses.

After the aeration, the aerated surface is advantageously passed over with a suction apparatus 82 (vacuum) to remove, for example, the aeration pieces from the turf or lawn. Most advantageously the aerator and the suction apparatus are integrated in order to collect right away all aeration pieces.

Advantageously, aerator 81 is placed rearward from the wheels, or at least rearward from the front wheels, of the lawn maintenance machine A,B. Hence, the weight of the lawn maintenance machine A,B is not affecting to the quality of the aerated, soft surface of the turf or lawn.

The means for aeration, i.e. the aerator, may comprise, for example, a tine aerator, such as a hollow aerator, or a solid tine aerator. The aeration is used for boosting turf or lawn health, because it allows turf or lawn to breathe well. For example, a hollow aerator cuts the ground and removes some of the soil allowing the turf or lawn to breathe.

After the aeration, especially when using the hollow aerator, aeration cores are preferably removed. If any topdressing is not added after the aeration, especially after using a hollow aerator, it is possible to decrease the height of turf or lawn. The effect of the treatment may be 2-3 cm in one go.

Alternatively, if solid tine aerator is used and topdressing is added after the aerating onto the aeration holes, it is possible to increase the height of turf or lawn. The effect of the treatment may be 2-3 cm in one go.

The lawn maintenance machine A, B advantageously comprises a scarifier/verticutter. Blades of verticutter make vertical cuts in the ground, cutting runners in the turf or lawn and removing dead foliage from the turf or lawn. After the cutting, the de-attached thatch is preferably removed, most preferably using a suction apparatus.

In an embodiment, the verticutter is used to obtain furrows. Preferably, the verticutter is first used to obtain a furrow, then a suction apparatus 82 is used to remove the obtained thatch/thatch layer, after which topdressing is added by a spreader 85 onto said furrow, wherein these steps are preferably implemented by the same lawn maintenance machine in one go. Most advantageously, the verticutter and the suction apparatus are integrated in order to collect right away the removed thatch layer.

After the vacuuming, topdressing and/or seeds and/or a fertilizer is preferably added onto the aerated surface.

Most preferably, the verticutter is used to obtain a furrow, then a suction apparatus is used to remove the obtained thatch/thatch layer, then seeds are planted onto the furrow by a seeder, after which topdressing is added to fill the furrow, wherein all these steps are preferably implemented by the same lawn maintenance machine in one go. Therefore, the lawn maintenance machine is advantageously configured for verticutting, vacuuming, seeding, and topdressing in one go.

Advantageously, the first conveyor 50 is configured to extend rearward from the aerator 81. Therefore, it is possible to apply topdressing after the aeration/verticutting and vacuuming steps in one go.

The lawn maintenance machine A,B preferably comprises a suction apparatus 82 to collect material(s) from the surface of the turfgrass. The suction apparatus preferably comprises a first conduit member 70 to feed material(s) in to the container 10, preferably in to the first storage 20.

The suction apparatus 82 can be a vacuum apparatus. The first conduit member 70, such as a tube conveyor, is providing a passage between surface of turf or lawn and the first storage 20 of the container 10. The suction apparatus 82 preferably comprises an air-pressure control means for direction air-flow in said first conduit member. Therefore, the dead foliage can be collected through the first conduit member and deposited in the first storage 20. Therefore, the first conduit member 70 provides a passage for the dead foliage collected from the turf or lawn into the first storage 20 of the container 10.

Advantageously, the suction apparatus is integrated with an aerator and/or a verticutter in order to collect material(s) straight from the aerator and/or from the verticutter before topdressing or some other material(s) is added onto the turf or lawn. Advantageously, the suction apparatus 82 is placed at least partly under the container 10, most preferably at least partly under the first conveyor 50.

Advantageously, the first conveyor 50 extends rearward from the suction apparatus 82. Therefore, it is possible to collect material to be removed from the turfgrass, such as aeration pieces, before applying material, such as topdressing, on to the turf in one go.

The material to be moved from the turf or lawn may comprise, for example, clippings, scarifies, verti-cuts, aeration pieces and the like collected from the turf or lawn or the like.

Advantageously, the lawn maintenance machine A,B comprises means for seeding. The means for seeding comprises, for example, a seeder 83. Advantageously, the seeder 83 is placed rearward from the aerator. Therefore, seeds can be added to the aerating hollows, preferably at least partly to a predetermined depth. This may reduce the required amount of the needed seeds.

Advantageously, the lawn maintenance machine comprises a seeder 83 and a spreader 85 for topdressing and the seeder is placed frontward from the spreader for the topdressing. This may increase the effectiveness of the seeding.

Advantageously, the first conveyor 50 extends rearward from the seeder 82. Therefore, it is possible to add seeds on to turf or lawn, before applying material, such as topdressing, on to turf or lawn in one go.

Advantageously, the lawn maintenance machine A,B comprises means for fertilizing and/or means for pesticide spreading.

The means for fertilizing advantageously comprises a feeding container 90 for solid fertilizing material(s). In this case, the solid fertilizing material is preferably added into the topdressing to be added onto the turf or lawn via a spreader 85. Therefore, it is possible to add fertilizing material(s) or another material(s) so that they will be mixed with topdressing and added onto a surface of turf or lawn together with topdressing.

Alternatively or in addition, the means for fertilizing may comprise a chemical tank and a distributor (not shown in Figures), preferably provided with air pressure controls and a conduit member, to dispense fertilisers or the like to a turf or lawn surface.

The means for pesticide spreading may comprise a chemical tank and a distributor, preferably provided with air pressure controls and a conduit member, to dispense pesticides or the like to a turf or lawn surface.

Advantageously, the lawn maintenance machine A,B can be configured for topdressing, i.e., to apply a material, preferably in a thin layer, to the surface of turfgrass.

Topdressing applied to the surface of turf or lawn may be, for example, sand, sandy topsoil, compost, calcined clay or vitrified clay or a combination of any of these materials. Topdressing can be used to develop or maintain a smooth playing surface by eliminating holes or ridges that negatively impact player safety and ball performance.

Advantageously, the lawn maintenance machine A,B comprises a spreader 85 for topdressing, which spreader 85 spreads the material to be applied on to the surface of the turf or lawn. Advantageously, the spreader 85 is used to distribute the applied material evenly to the working area. Therefore, the first conveyor 50 preferably extends from the container 10 to the spreader 85. Therefore, it is possible to apply material, such as topdressing, via the first conveyor to the spreader.

Preferably, the first conveyor 50 applies the material to be added onto the surface of the turf or lawn from the second storage 30 to the spreader 85 via the hatch 12.

Advantageously, the lawn maintenance machine comprises:
  a spreader,
  an aerator and/or a verticutter, and
  a suction apparatus
wherein the spreader 85 for the topdressing is placed rearward from the aerator/verticutter and the suction apparatus 82. When applied following core or spike aeration and vacuuming, the topdressing material can filter into the holes opened by the aeration process, speeding turf or lawn recovery. This may increase the quality of the turf or lawn by helping to focus the topdressing onto and into the hollows caused by the aerator 81.

Further, the lawn maintenance machine preferably comprises a brusher 87 (i.e. a lawn comb). Furthermore, the lawn maintenance machine preferably comprises finishing roller(s) 86. Advantageously, the finishing roller(s) 86 uses compressive forces on the lawn or turf in order to make to surface of turf or lawn to be more even. Further, the finishing rolls may be used to improve (to get higher) Stimpmeter values.

Advantageously, the finishing rollers 86 are positioned rearward from the first conveyor 50. Therefore, it is possible to use the finishing roll after applying material, such as topdressing, via the first conveyor on to the turf or lawn.

Advantageously, the lawn maintenance machine A,B comprises several means 80 for caring a surface of turf or lawn or lawn. The means 80 for caring a surface of the turf or lawn may comprise, for example, an aerator 81, a verticutter, a suction apparatus 82, a seeder 83, a tank and a distributor for chemicals(s), a spreader 85 for topdressing, a brusher 87, and finishing rollers 86.

Advantageously, the lawn maintenance machine A,B can be configured at least for three different kind of jobs, preferably at least for four different kind of jobs selected from the following list:

topdressing,
aerating,
pesticide spreading,
seeding, and
fertilizing.

In other words, the lawn maintenance machine A,B can be a multi-job machine having multiple implements for performing several different kinds of jobs in one go.

Advantageously, the lawn maintenance machine A,B comprises a mowing unit(s) 88 and a suction apparatus 82, wherein the suction apparatus 82 is placed rearward from the mowing units 88 in order to collect and remove the debris from the surface of the turf or lawn. Therefore, it is possible to to collect and remove the debris from the surface of the turf or lawn in one go.

Advantageously, the lawn maintenance machine A,B is configured at least for aeration and topdressing.

Advantageously, the lawn maintenance machine comprises a seeder 83 for seeding and/or a spreader 85 for topdressing, wherein the topdressing is placed rearward from the seeder. Therefore, it is possible to add topdressing on the seeds in one go.

Advantageously, the lawn maintenance machine A,B comprises an aerator 81 and a suction apparatus 82, wherein the suction apparatus 82 is placed rearward from the aerator 81 or integrated with the aerator in order to collect and remove the aeration pieces from the surface of the turf or lawn. Therefore, it is possible to air the turfgrass and collect and remove the aeration pieces from the surface of the turf in one go.

Advantageously, the lawn maintenance machine A,B comprises a seeder 83, an aerator 81 and a spreader 85 for topdressing, wherein the seeder 83 is placed rearward from the aerator 81, and the spreader 85 for topdressing is placed rearward from the seeder 83.

Topdressing can be used following seeding to increase soil contact and help retain moisture to protect the developing plants from drying out during the establishment process.

Further, due to the multi-job machine, seeds, fertilizers and pesticides may be used merely where they are needed. Further, seeds, fertilizers and pesticides may be used in the depth needed. Therefore, the amount of used material(s) and chemical(s) may be decreased because there is no need to flush excess materials into the environment. Hence, material costs may be decreased while providing eco-friendly turf or lawn care, for example for golf courses.

Advantageously, the first conveyor 50 unloading material from the second storage 30 of the container 10 to be applied onto the turf or lawn reaches over at least some of those means for caring the surface of the turf or lawn 80. Therefore, at least some of the means for caring the surface of the turf or lawn 80 are preferably placed at least partly under the first conveyor 50. Therefore, it is possible to apply the material stored into the second storage 30 onto the surface of the turf or lawn, which surface is aired and/or cleaned and/or otherwise modified.

Due to the multi-job machine, the maintenance time of the turf or lawn may be reduced significantly. Hence, the maintenance can interrupt users, such as game players, less than usually. Therefore, it is possible to improve an efficiency of the ground, because the lawn maintenance does not take as much time, for example from the players, as usually.

FIGS. 4-6*b* illustrate a rear part of the lawn maintenance machine A,B comprising a mechanism to move the movable wall 40. FIGS. 7*a*-9*b* shows the mechanism for the movable wall 40, which mechanism can be used in order to move the movable wall 40.

The mechanism for a movable wall 4 preferably comprises an actuator arrangement configured to move the movable wall 40 forward and backward in the longitudinal direction in order to decrease and increase the volume of the second storage. The actuator can operate manually or automatically. Advantageously the actuator operates automatically.

Advantageously, there is a movable wall 40 in the container 10, which movable wall 40 divides the container into the first storage 20 and the second storage 30. Preferably, the movable wall 40 can be configured to change a surface area and, hence, the volume of the storages 20,30 in such a way that the volume of the first storage 20 is increased when the volume of the second storage 30 is decreased and, also, that the volume of the second storage 30 is increased when the volume of the first storage 20 is decreased.

Advantageously, the mechanism to move the movable wall 40 comprises upper supporting means 41 of the movable wall 40. The upper supporting means 41 are preferably attached to the movable wall 40.

The upper supporting means 41 of the movable wall preferably comprises upper supporting rolls. The mechanism for the movable wall preferably comprises upper supporting means in both upper corners of the movable wall 40 as shown, for example, in FIG. 9*a*.

Advantageously the mechanism for the movable wall 40 comprises lower supporting means 42 of the movable wall 40. The lower supporting means 42 are preferably attached to the movable wall 40.

The lower supporting means 42 of the movable wall preferably comprises lower supporting rolls. The mechanism for the movable wall preferably comprises lower supporting means in both lower corners of the movable wall 40 as shown, for example, in FIG. 9*a*.

The supporting means 41,42 of the movable wall 40 support the movable wall and, hence, it is possible to obtain a strong structure for the movable wall of the container 10 also during the movements. Advantageously, the movable wall is not used to convey the material placed into the container 10, but the movable wall is merely used to support the first conveyor 50 which is used to convey the material by keeping all materials in their own storages 20,30.

Advantageously, the mechanism for the movable wall 40 comprises both, the upper supporting means 41 in order to support both upper corners of the movable wall 40 and lower supporting means 42 in order to support both lower corners of the movable wall 40.

Advantageously, the mechanism for the movable wall 40 comprises transferring means 43, 44, 45, 48 in order to move the movable wall. The transferring means preferably comprises a belt and pulley system, wherein the belts 43, 44, 48 are looped over pulleys 45 and power transmission is achieved by said belts and pulleys. The transferring means are preferably used to move the movable wall rearwards and forwards and, in addition, to keep the movable wall vertically stable when it is moved horizontally.

The transferring means 43, 44, 45, 48 of the movable wall 40 preferably comprises belts 43, 44, 48. The belts 43, 44, 48 preferably comprise at least one upper transferring belt 43 and at least one lower transferring belt 44. Further, the belts 43,44,48 preferably comprise at least one connecting belt 48, which connecting belt 48 preferably connect the lower transferring belt 44 to the upper transferring belt 43.

Advantageously, the container 10 comprises a first side (right side of the lawn maintenance machine) having first means 41*a*, 42*a*, 43*a*, 44*a*, 45*a*, 46*a*, 47*a* to move the movable wall. Further, advantageously the container 10 comprises a second side (left side of the lawn maintenance machine) having second means 41*b*, 42*b*, 43*b*, 44*b*, 45*b*, 46*b*, 47*b* to move the movable wall (shown in FIG. 9*a*).

Most advantageously, first connecting belt 48*a* connects the first lower transferring belt 44*a* to the first upper transferring belt 43*a*. Further, most advantageously, second connecting belt 48*b* connects the second lower transferring belt 44*b* to the second upper transferring belt 43*b*. Preferably the transferring means comprises at least two upper transferring belts 43*a*, 43*b*, at least two lower transferring belts 44*a*, 44*b*, and at least two connecting belts 48*a*, 48*b*.

Further, the transferring means 43, 44, 45, 48 preferably comprises pulleys 45 for the belts 43, 44, 48. Advantageously, the pulleys 45 are used together with the belts 43, 44, 48 in order to move the movable wall 40. The movable wall 40 is preferably attached to the upper belt 43 via the upper supporting means 41 and to the lower belt 44 via the lower supporting means 42. Thus, advantageously, the movable wall 40 is attached to both, the upper and lower transferring belts 43, 44.

Advantageously, the transferring means 43, 44, 45, 48 are used to change the position of the movable wall 40 via upper and lower supporting means 41,42.

Figure 9A:
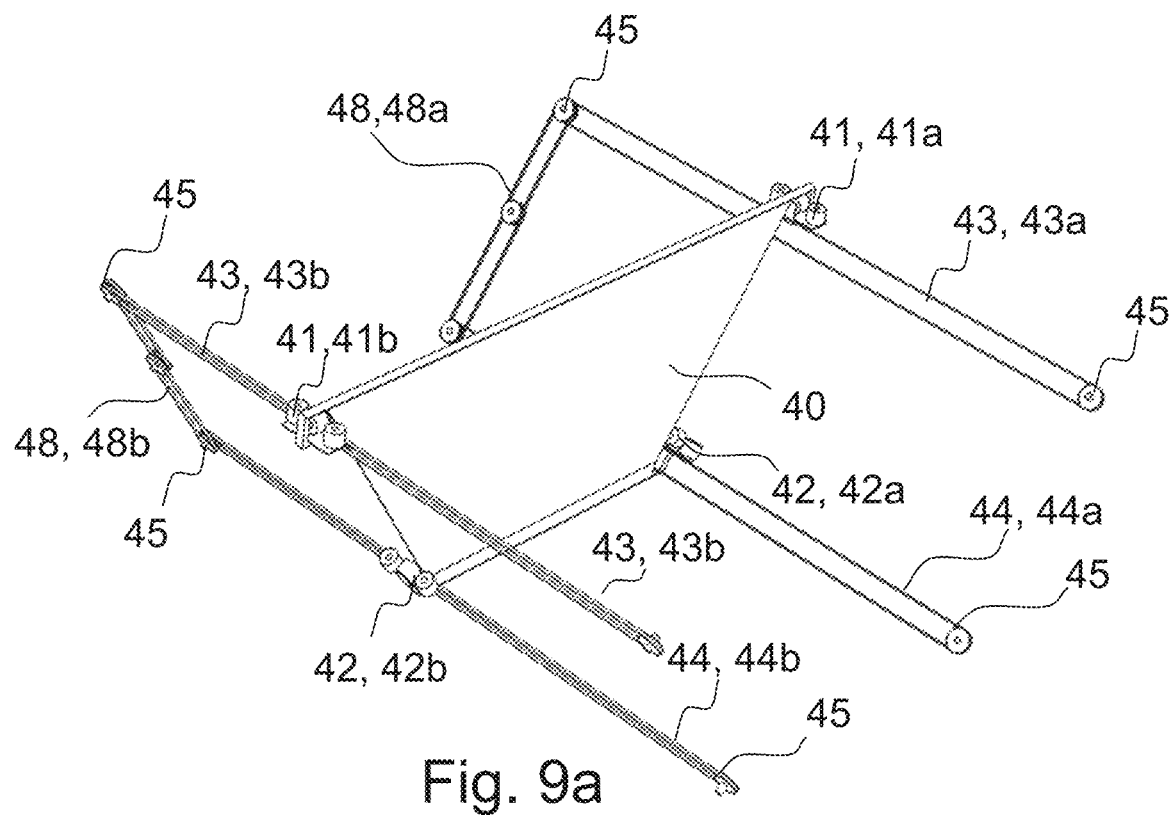
FIG. 9a shows, by way of an example, a rear-side perspective view of an example mechanism for a movable wall.
Figure 9B:
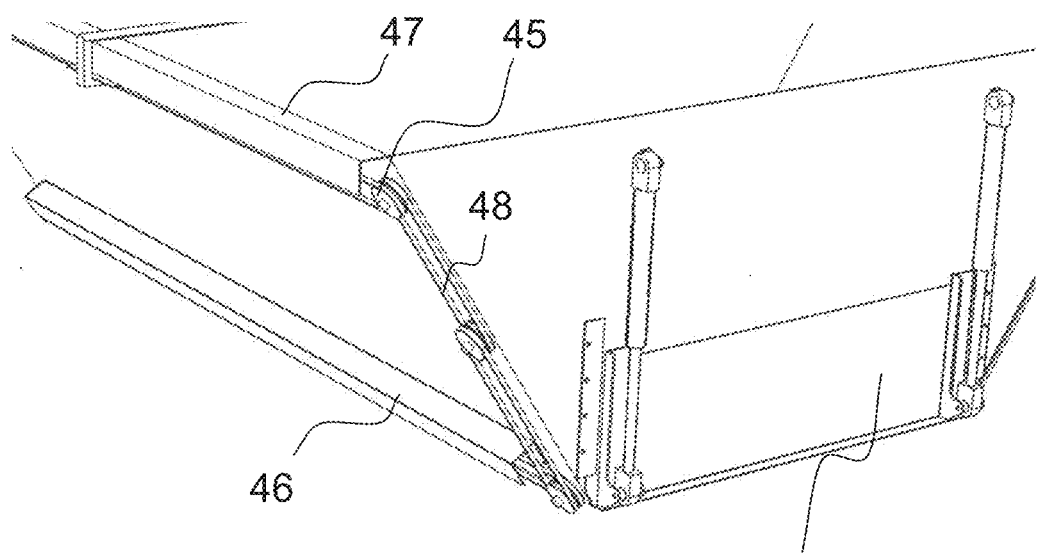
FIG. 9b shows, by way of an example, a front-side perspective view of a corner of the container showing a part of the example mechanism for a movable wall.

Advantageously, the mechanism for the movable wall 40 comprises a lower steering bar 46 for the lower transferring belt 44 (shown in FIG. 9*b*). Furthermore, the mechanism for the movable wall 40 preferably comprises an upper steering bar 47 for the upper transferring belt 43 (shown in FIG. 9*b*). Most advantageously, the mechanism for the movable wall 40 comprises both, the lower steering bar 46 for the lower transferring belt and the upper steering bar 47 for the upper transferring belt 43.

FIGS. 10*a*-10*b* illustrate two lawn maintenance machines which may co-operate with each other, a first lawn maintenance machine A and a second lawn maintenance machine B.

The lawn maintenance method preferably comprises two lawn maintenance machines A,B. Each of lawn maintenance machines A, B can have the structure as disclosed in this application.

Preferably, the usage of the second lawn maintenance machine B differs from the usage of the first lawn maintenance machine A in such a way that the first storage B20 of the second lawn maintenance machine is preferably used for topdressing or similar material and the second storage B30 of the second lawn maintenance machine is preferably used for material collected from turf or lawn. Therefore, it is easy to transfer materials between the lawn maintenance machines (shown in FIGS. 10*a*-*b*).

As disclosed above, also the second lawn maintenance machine B has a container B10, which container has a movable wall B40. The movable wall B40 preferably divides the container B10 of the second lawn maintenance machine into two storages B20, B30 separated by the movable wall B40 as discussed in this application.

Advantageously, a front part of the second lawn maintenance machine comprises at least a cabin. The second lawn maintenance machine may have a structure, wherein a rear part of the second lawn maintenance machine comprising a container B10 is coupled to the front part of the second lawn maintenance machine via a coupler. In this case, the front part of the second lawn maintenance machine preferably comprises six wheels or from 5 to 7 wheels and the rear part of the second lawn maintenance comprises four wheels or from 4 to 6 wheels.

Further, also the second lawn maintenance machine B preferably has a first conveyor B50, preferably a bottom conveyor.

Advantageously, the second storage B30 of the second lawn maintenance machine B comprising material collected from turf or lawn is rearward from the first storage B20 of the second lawn maintenance machine. Further, advantageously the first storage B20 of the second lawn maintenance machine B comprising material to be apply on to the turf or lawn is frontward from the second storage B30 of the second lawn maintenance machine.

The second lawn maintenance machine B is preferably configured to convey material to be apply on to the turf or lawn from the first storage B20 of the second lawn maintenance machine B to the second storage 30 of the first lawn maintenance machine A.

Further, the first lawn maintenance machine A is preferably configured to convey material collected from surface of turf or lawn from the first storage 20 of the first lawn maintenance machine A to the second storage B30 of the second lawn maintenance machine B.

The movable wall B40 of the second lawn maintenance machine and the first conveyor B50 of the second lawn maintenance machine B preferably works as the movable wall and first conveyor 50 of the first lawn maintenance machine.

When the lawn maintenance machine A starts turf or lawn care, the first storage 20 may be substantially empty while the second storage 30 may have more material(s), such as topdressing or other material(s).

When the lawn maintenance machine A has started the turf or lawn care, some matter to be collected from the turf or lawn is preferably added into the first storage 20 while some material of the second storage 30 is preferably applied onto a turf or lawn.

Finally, the second storage 30 of the lawn maintenance machine A may be substantially empty while the first storage 20 of the lawn maintenance machine A may have lots of material(s), such as aeration pieces or other materials collected from the turf or lawn. This material is preferably conveyed from the first lawn maintenance machine into the second storage B30 of the second lawn maintenance machine.

In an embodiment, the lawn maintenance machines A is configured at least for topdressing in such a way that it does not have the suction apparatus at all. In this case, it is possible to load the container 10 of the lawn maintenance machine A full of topdressing. In this case, only the second storage 30 of the lawn maintenance machines A is used and it is preferably filled with topdressing. Thus in this case, preferable a volume of the second storage is controlled by a movable wall to be as large as is possible.

In an embodiment, both lawn maintenance machines A, B are configured at least for topdressing in such a way that they do not use the suction apparatus at all. In this case, it is possible to load the both containers 10, B10 of the lawn maintenance machines full of topdressing. In this case, only the second storages 30, B30 of the lawn maintenance machines A,B are used and filled with topdressing. Thus in this case, preferable volumes of the second storages are controlled by the movable walls to be as large as is possible.

Advantageously:
first, a longitudinal length 20a of the first storage 20 for material(s) to be collected from turf or lawn is smaller than a longitudinal length 30a of the second storage 30 comprising material(s) to be added onto the turf or lawn. For example, the longitudinal length of the first storage 20 may be at least 30%, preferably at least 50% and more preferably at least 70% smaller (up to 99% smaller) than the longitudinal length of the second storage 30.
then, a longitudinal length of the first storage 20 comprising material collected from turf or lawn is same as a longitudinal length of the second storage 30 comprising topdressing or similar material, and
finally, a longitudinal length 20a of the first storage 20 comprising material(s) collected from turf or lawn is larger than a longitudinal length 30a of the second storage 30 comprising topdressing or similar material. For example, the longitudinal length of the second storage 30 may be at least 30%, preferably at least 50% and more preferably at least 70% smaller (up to 99% smaller) than the longitudinal length of the first storage 20.

Preferably, the lawn maintenance method comprises the following steps:
collecting material(s), such as clippings, scarifies, verticuts and/or aeration pieces, from turf or lawn, and
conveying said material(s) to the first storage 20 of the lawn maintenance machine.

Further, the lawn maintenance method preferably comprises the following steps:
aerating turf or lawn, and
collecting material(s), such as aeration pieces, from the turf or lawn in one go.

Further, the lawn maintenance method preferably comprises the following steps:
aerating turf or lawn, and
applying topdressing on to the turf or lawn after said aerating.

Further, the lawn maintenance method preferably comprises the following step:
moving the movable wall 40 before and/or after and/or during conveying at least some material to the first storage 20.

Further, the lawn maintenance method preferably comprises the following step:
Applying topdressing from the second storage 30 of the lawn maintenance machine on to turf or lawn, preferably with a spreader 85.

Further, the lawn maintenance method preferably comprises the following step:
moving the movable wall 40 after and/or during conveying at least some material from the second storage 30 on to turf or lawn.

The lawn maintenance method preferably comprises the following step:
conveying material(s) from the first storage 20 of the first lawn maintenance machine to a second storage B30 of a second lawn maintenance machine B, preferably via a second conveyor 60 of the first lawn maintenance machine A.

Further, the lawn maintenance method preferably comprises the following step:
conveying material(s) to be applied on to turf or lawn, such as topdressing, from a first storage B20 of the second lawn maintenance machine B to the second storage 30 of the first lawn maintenance machine A.

The lawn maintenance method may comprise some or all above mentioned steps.

Advantageously, the lawn maintenance machine comprises means for caring a surface of a turf or lawn, such as
means for aeration (such as an aerator), and/or
means for verticutting (such as a verticutter), and/or
means for seeding (such as a seeder), and/or
means for collecting dead foliage and/or aeration pieces (such as a suction apparatus),
which means are at least partially:
under the container 10, and/or
under the first conveyor 50.

Advantageously, at least an aerator and a suction apparatus are placed at least partly under the container 10 and/or under the first conveyor 50. Therefore, it is possible, for example, to add topdressing straight onto the aeration holes.

One skilled in the art readily understands that the different embodiments of the invention may have applications in environments where optimization of turf or lawn care is desired. It is also obvious that the present invention is not limited solely to the above-presented embodiments, but it can be modified within the scope of the appended claims.

The invention claimed is:

1. A lawn maintenance machine comprising
a container and
a movable wall,
the movable wall dividing the container to a first storage having a first length in a longitudinal direction, and a second storage having a second length in the longitudinal direction, wherein the second storage is placed rearward from the first storage,
the lawn maintenance machine further comprising
an actuator arrangement configured to move the movable wall forward and backward in the longitudinal direction in order to increase and decrease, respectively, the volume of the second storage
wherein the lawn maintenance machine further comprises
an aerator and/or a verticutter, and
a suction apparatus,
and wherein the suction apparatus is located rearward from the aerator or the verticutter or integrated with the aerator or the verticutter.

2. The lawn maintenance machine according to claim 1, wherein the container comprises a first conveyor, which is configured to convey material from the container rearward or forward, or both rearward and forward.

3. The lawn maintenance machine according to claim 2, wherein the first conveyor extends rearward from the container.

4. The lawn maintenance machine according to claim 1, wherein the movable wall is configured to move rearward while driving the lawn maintenance machine in order to increase the first longitudinal length and decrease the second longitudinal length.

5. The lawn maintenance machine according to claim 1, wherein the movable wall is configured to have at least a first position and a second position, between which the movable wall can be moved, and the first length of the first storage is at least 40% smaller than the second length of the second storage in said first position and the second length of the second storage is at least 40% smaller than the first length of the first storage in said second position.

6. The lawn maintenance machine according to claim 1, wherein the first storage comprises
first openable hatch for unloading the first storage.

7. The lawn maintenance machine according to claim 6, wherein the first hatch is configured to open when the first conveyor is conveying material frontward.

8. The lawn maintenance machine according to claim 1, wherein the second storage comprises
a second openable hatch for unloading the second storage.

9. The lawn maintenance machine according to claim 8, wherein the second hatch is configured to open when the first conveyor is conveying material rearward.

10. The lawn maintenance machine according to claim 1, wherein the lawn maintenance machine further comprises at least
a spreader for topdressing.

11. The lawn maintenance machine according to claim 1, wherein the lawn maintenance machine comprises
first conveyor, and
at least one of the following means:
seeder,
aerator,
verticutter, and/or
suction apparatus,
wherein the first conveyor extends rearward from at least one of the mentioned means.

12. A method for taking care of a lawn or a turf, the method comprising
providing a lawn maintenance machine according to claim 1,
applying a topdressing material onto the lawn or turf by moving the movable wall rearward while driving the lawn maintenance machine on the lawn or the turf.

13. A lawn maintenance method comprising
providing a first lawn maintenance machine according to claim 1, and
providing a second lawn maintenance machine according to claim 1,
wherein the method comprises:
unloading at least some material from the first storage of the container of the first lawn maintenance machine in to the second storage of the container of the second lawn maintenance machine.

14. A lawn maintenance system comprising
a first lawn maintenance machine according to claim 1, and
a second lawn maintenance machine according to claim 1,
wherein the system further comprises:
a second conveyor of the first lawn maintenance machine, which is configured to convey at least some material from the container of the first lawn maintenance machine in to the second storage of the container of the second lawn maintenance machine.

15. A lawn maintenance machine comprising
a container and
a movable wall,
the movable wall dividing the container to a first storage having a first length in a longitudinal direction, and a second storage having a second length in the longitudinal direction, wherein the second storage is placed rearward from the first storage,
the lawn maintenance machine further comprising
an actuator arrangement configured to move the movable wall forward and backward in the longitudinal direction in order to increase and decrease, respectively, the volume of the second storage
wherein the second storage comprises a second openable hatch for unloading the second storage.

* * * * *